(12) United States Patent
Woods et al.

(10) Patent No.: US 7,817,384 B2
(45) Date of Patent: Oct. 19, 2010

(54) CONTROL AND PROTECTION METHODOLOGIES FOR A MOTOR CONTROL MODULE

(75) Inventors: Samuel G. Woods, Bel Air, MD (US); Jason K. Leh, Parkville, MD (US); David R. Beers, Dallastown, PA (US); Michael K. Forster, White Hall, MD (US); John C. Vanko, Timonium, MD (US); William F. Gallagher, Stewartstown, PA (US); William G. Kalbfleisch, Reisterstown, MD (US); Robert A. Usselman, Forest Hill, MD (US); Zollie W. Privett, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/469,376

(22) Filed: May 20, 2009

(65) Prior Publication Data

US 2009/0224703 A1 Sep. 10, 2009

Related U.S. Application Data

(62) Division of application No. 11/543,990, filed on Oct. 6, 2006, now Pat. No. 7,551,411.

(60) Provisional application No. 60/726,011, filed on Oct. 12, 2005, provisional application No. 60/817,085, filed on Jun. 29, 2006.

(51) Int. Cl.
*H02H 7/09* (2006.01)
(52) U.S. Cl. .......................... 361/33; 318/432; 318/434
(58) Field of Classification Search .................. 361/33, 361/87; 318/432, 434
See application file for complete search history.

(56) References Cited

U.S. PATENT DOCUMENTS

| 3,860,861 | A | * | 1/1975 | Gucker | 318/473 |
| 4,307,325 | A | * | 12/1981 | Saar | 388/809 |
| 4,413,325 | A | * | 11/1983 | Elfner et al. | 702/132 |
| 4,510,548 | A | * | 4/1985 | Boothman | 361/25 |
| 4,550,277 | A | * | 10/1985 | Carney | 388/809 |
| 4,576,226 | A | * | 3/1986 | Lipets et al. | 165/134.1 |
| 5,168,415 | A | * | 12/1992 | Osuga | 361/28 |
| 5,588,092 | A | * | 12/1996 | Komiya et al. | 358/1.9 |
| 5,600,575 | A | * | 2/1997 | Anticole | 702/132 |
| 5,726,911 | A | * | 3/1998 | Canada et al. | 702/32 |

(Continued)

*Primary Examiner*—Rita Leykin
(74) *Attorney, Agent, or Firm*—Amir R. Rohani; Adan Ayala

(57) ABSTRACT

A motor control module designed to control operation of a plurality of different motors in a plurality of different tools a power tool uses an electronic clutch in the module in conjunction with a mechanical clutch in the tool to protect the tool against an overload event. The module is adapted to implement methods to provide aural and/or tactile feedback to a tool user as a warning of an impending or current fault condition in the tool. The module can prevent power from inadvertently turning on either after an overload event has cleared with the tool plugged in and its power switch on, or after plugging in the tool within the power switch on. The control module is adapted to provide torque control for the power tool, to estimate tool motor temperature and to inform a tool user when a servicing need in the tool is required.

7 Claims, 15 Drawing Sheets

U.S. PATENT DOCUMENTS

| | | | | |
|---|---|---|---|---|
| 5,852,351 A | * | 12/1998 | Canada et al. | 318/490 |
| 6,208,498 B1 | * | 3/2001 | Ueda | 361/160 |
| 6,297,742 B1 | * | 10/2001 | Canada et al. | 340/635 |
| 6,369,973 B1 | * | 4/2002 | Mushika et al. | 360/78.07 |
| 7,164,248 B2 | * | 1/2007 | Hayashi | 318/434 |

* cited by examiner

CONTROL AND PROTECTION METHODOLOGIES FOR A MOTOR CONTROL MODULE

PRIORITY STATEMENT

This application is a divisional of U.S. patent application, U.S. Ser. No. 11/543,990 filed Oct. 6, 2006, which claims the benefit under 35 U.S.C. §119(e) to U.S. Provisional Patent Applications Ser. No. 60/726,011, filed Oct. 12, 2005 to Samuel G. WOODS et al. and entitled "UNIVERSAL CONTROL MODULE", and Ser. No. 60/817,085, filed Jun. 29, 2006 to Samuel G. WOODS et al. and entitled "CONTROL AND PROTECTION METHODOLOGIES FOR MOTOR CONTROL MODULE". The entire contents of the above applications are hereby incorporated by reference herein.

BACKGROUND

1. Field of the Invention

Example embodiments in general relate to control and protection methodologies provided by a control module designed to control operation of a motor, so as to protect the motor and an associated electrical device such as a power tool that is powered by the motor.

2. Description of the Related Art

Typically, motors are controlled by dedicated analog or digital circuitry controlling the motor for a given application. For example, a dedicated circuit may be required to control a given motor utilized in an application for an electrical device such as a power saw application, while another dedicated circuit may be required to control a different motor utilized in another power tool application such as a drill application. The dedicated analog or digital control circuit is typically constructed of different components. These components often have differing values, tolerances and/or control software to create a unique operational characteristic profile for a given motor and/or given motor application.

SUMMARY

Example embodiments are directed to control and protection methodologies of a motor control module which controls operation of a motor, such as a tool motor of a corded power tool. In one example, the control module includes an electronic clutch for protecting the tool against an overload event. The electronic clutch in the module is usable with a mechanical clutch in the tool to protect the tool against an overload event. Other protection methodologies in the module include methods to provide aural and/or tactile feedback to a user of the tool as a warning of an impending or current fault condition in the tool. This may be done by pulsing the tool motor, or by folding back voltage applied to the tool motor (motor foldback). Pulsing and motor foldback may be invoked by a microprocessor in the control module controlling a triac in the module to alter or change the voltage applied to the tool motor.

Another protection methodology of the control module prevents power from inadvertently turning on either after an overload event has cleared with the tool plugged in and its power switch on, or after plugging in the tool within the power switch on. A further protection methodology in the module provides torque control for the power tool using motor foldback if a measured torque reaches a given setpoint.

In another example, control methodologies in the control module can estimate tool motor temperature, including tool motor temperature upon tool startup, or can inform a tool user when a servicing need in the corded power tool is required. In a further example, the control module is configurable to control a plurality of different motors in a plurality of different tools. The control module includes a microprocessor configured to execute a plurality of different protection or control functions to control a tool motor, and includes at least one memory for storing a plurality of soft-coded coefficients which can be set so as to enable or disable selected ones of the different protection or control functions in the module. The soft-coded coefficients include a plurality of different selectable inputs that can be set as the input to a given selected function, and include a plurality of different selectable outputs that can be set as the output from a given selected function.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION OF THE EXAMPLE EMBODIMENTS

As to be described in detail hereafter, example embodiments are directed to control and/or protection methodologies implemented by the electronic circuit within a motor control module of an electronic device. In one example, the electronic device may be a corded power tool having a tool motor powered by an AC source voltage for driving a work piece or accessory of the power tool. The example embodiments hereafter describe control or protection methodologies as related to and including, but not limited to: power tool startup, overload or fault events which exceed one or more of a voltage, speed, current, torque and/or temperature threshold, and warning mechanisms which may alert a tool user of an impending fault and/or overload condition. In order to provide context for the example methodologies described hereafter, the inventors initially provide an overview of an example power device with control module, and an example block diagram of the control module's electronics.

Figure 1:
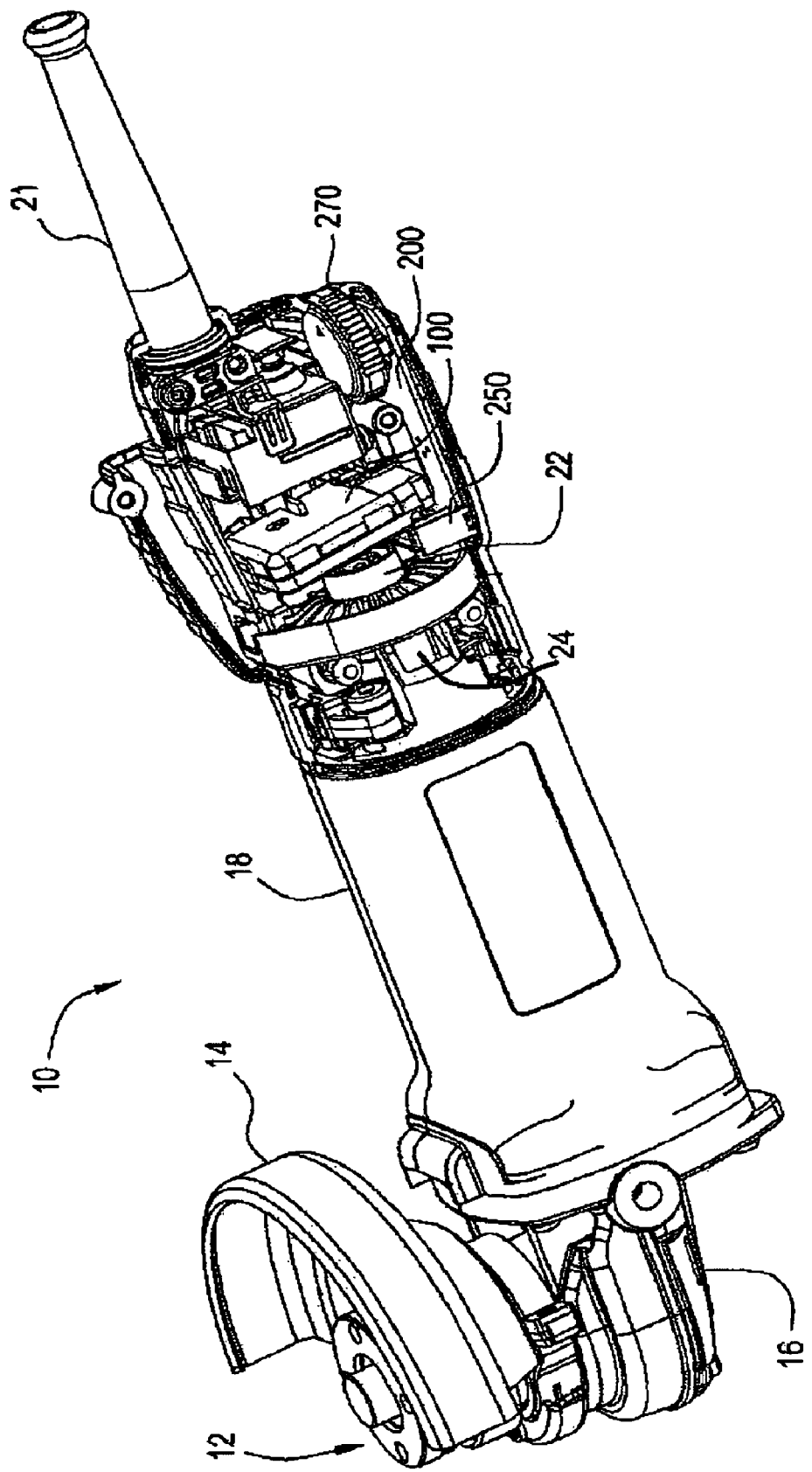
FIG. 1 is a partial plan view of a power tool illustrating the control module within the tool housing, in accordance with an example embodiment.

FIG. 1 is a partial plan view of a power tool illustrating a control module within a housing of the tool, in accordance with an example embodiment. Referring to FIG. 1, power tool 10 is shown embodied as a rotary, corded power tool 10, it being understood that the example embodiments are applicable to power tools other than rotary, corded power tools. In the example of FIG. 1, power tool 10 is shown as an angle grinder powered by AC line power via a power cord 21. The angle grinder 10 includes a knurled clamp nut 12 within an accessory guard 14 for receiving a tool workpiece or accessory powered by the tool motor. In this example, the accessory may be a rotary accessory such as grinding disc (not shown). The grinding disc is attachable via a spindle to gear case 16, which is secured to tool housing 18.

Gear case 16 also includes a mechanical clutch (not shown in FIG. 1 for clarity) for removing inertia in the system upon some detected fault condition. In one example, the mechanical clutch may be embodied as a cone clutch which rides inside a cone washer, and may include a thrust washer. The mechanical clutch is configured to remove inertia within gear case 16. In an example, the mechanical clutch actuates based on torque exceeding some set point, such as 100 in-lb for example. A detailed explanation of mechanical clutch operation is omitted for purposes of brevity.

Figure 13A:
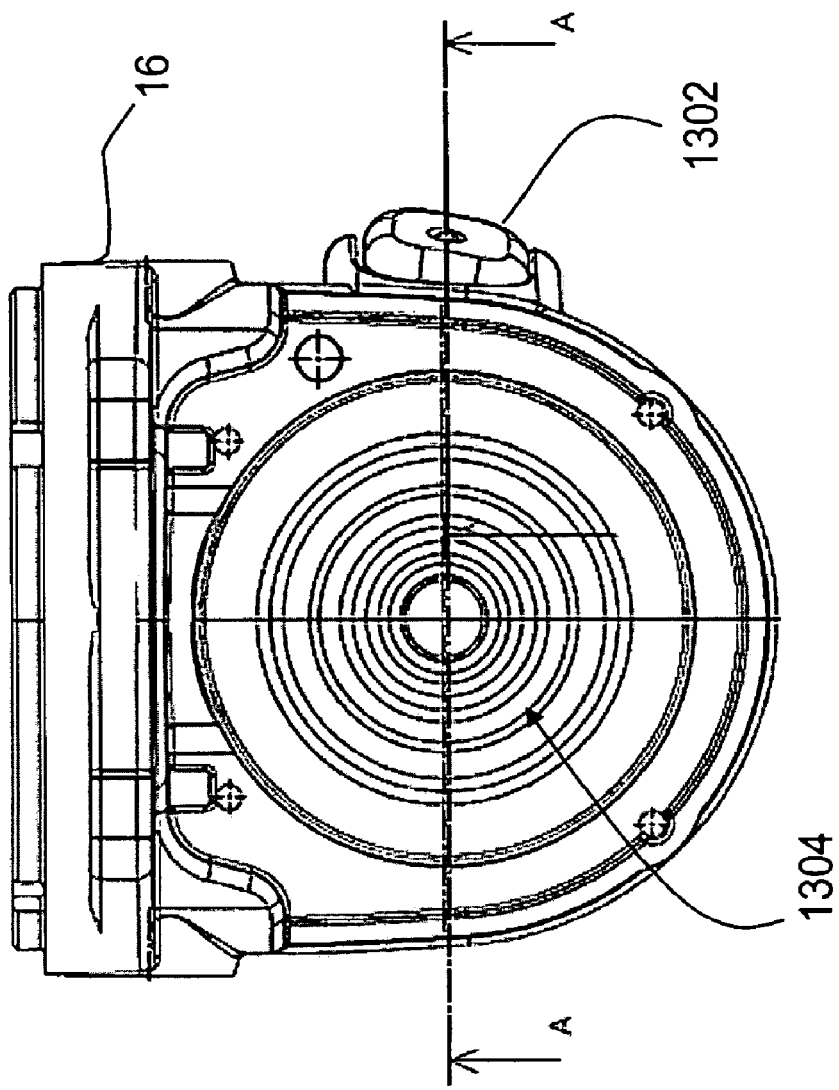
FIG. 13A is a front view of a portion of gear case 16 in FIG. 1.
Figure 13B:
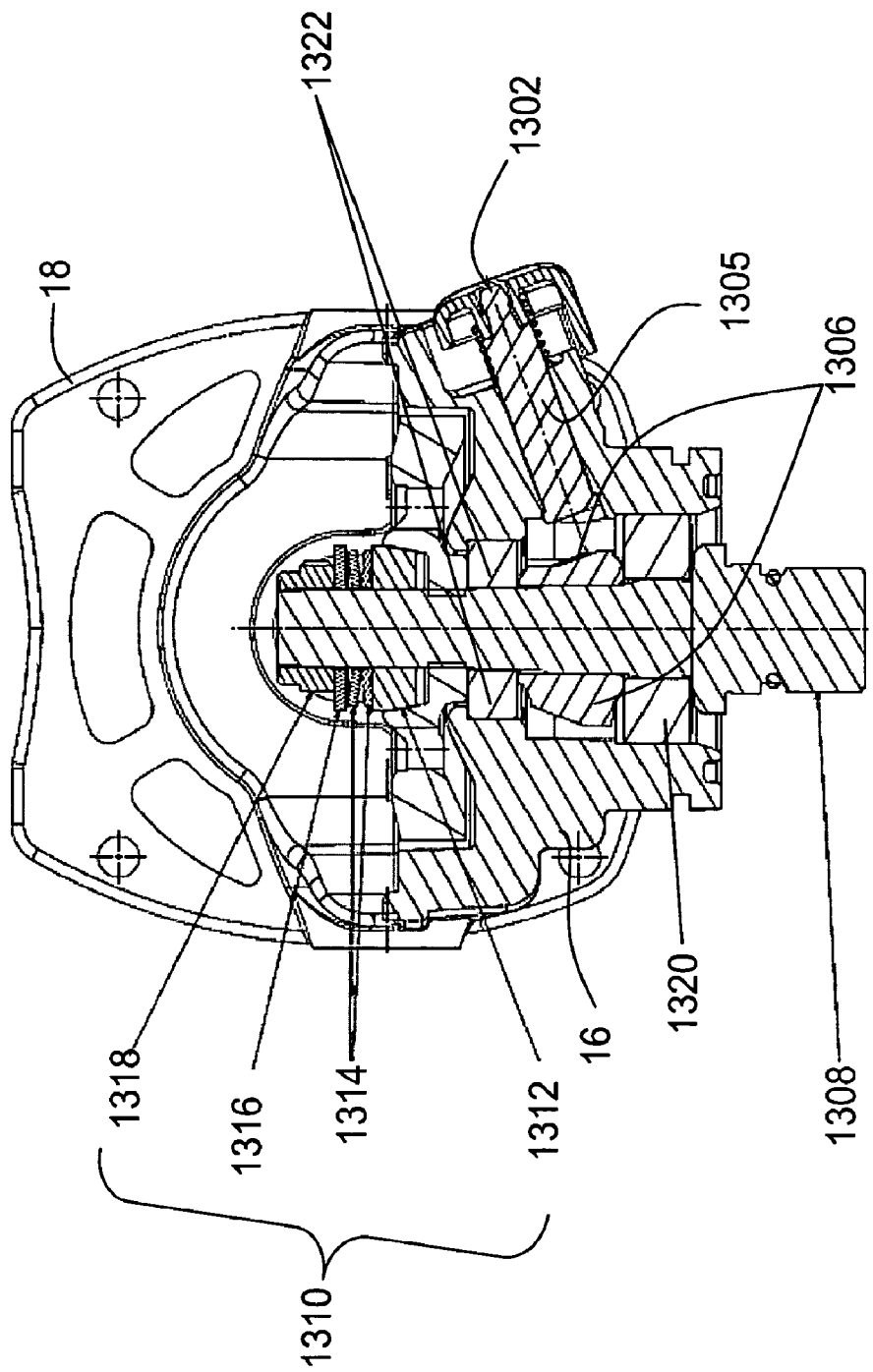
FIG. 13B is a cross sectional view of line A-A in FIG. 13A to illustrate details of the mechanical clutch.

FIG. 13A is a front view of a portion of gear case 16, and FIG. 13B is a cross sectional view of line A-A in FIG. 13A to illustrate details of the mechanical clutch. In FIG. 13A, a front view of the gear case 16 is shown with a gear case cover removed so as to illustrate gears 1304. Additionally, a spindle lock button 1302 is provided on the side of the gear case 16. The spindle lock button 1302 engages a spindle lock used to lock the spindle of the power tool 10 to allow for accessories to be replaced or removed thereon.

Referring to FIG. 13B, which is the sectional view across section A-A in FIG. 13A, the spindle 1308 is shown penetrating the gear case 16 through outer spindle bearings 1320 and inner spindle bearings 1322 to terminate at a nut 1318. The spindle bearings 1320, 1322 enable radial movement of the spindle 1308 as is known in the art. The mechanical clutch 1310 may be comprised of the cone clutch 1312, a pair of Belleville springs 1314, a washer 1316 and nut 1318. The mechanical clutch 1310 actuates in the event of a fault, such as a sudden stall of the tool, which could be due to an overload condition, bound accessory, etc. The mechanical clutch 1310 thus protects the user by loading down the gears 1304 so as to remove or release inertia from the system. Also shown in FIG. 13B is the spindle lock 1306, which may be engaged through a pin 1305 by actuation of the spindle lock button 1302. In FIG. 13B, the spindle 1308 is shown in an unlocked position.

The cone clutch 1312 is a double D fit (i.e., lock) and has side surfaces with a slightly inclined angle. Although not shown in FIG. 13B to illustrate the components of the mechanical clutch 1310, the gear 1304 is slip fit over the spindle 1308. When a load is applied to the spindle 1308 (such as in the event of a fault such as sudden stall due to an overload condition, bound accessory, etc.) the cone clutch 1312 becomes biased against the Belleville springs 1314, compressing the Belleville springs 1314 against the washer 1316 and nut 1318. This provides a force against the gear 1304 so as to load down the gear 1306 in order to release or remove inertia from the system. As the operation of a mechanical clutch for a power tool is known in the art, further detailed discussion is omitted for purposes of brevity.

Referring to FIG. 1, tool housing 18 is shown with part of the outer shell removed, so as to illustrate a universal control module 100 ('control module') in proximate relationship to a magnetic collar 22 and a commutator ring 24 of a motor armature 20. The control module 100 is designed for controlling the operation of a plurality of motors and/or configured for a plurality of different motor applications (e.g. different power tools).

Additionally in FIG. 1, there is shown an auxiliary board 200 supporting a pick-up coil assembly 250 and a variable speed dial wheel 270. As part of an assembly connected to the control module 100 within the power tool 10, the auxiliary board 200 may be included within the tool housing 18. One function of the auxiliary board 200 is it allows custom configuration of pick-up coil and variable speed dial as dictated by power tool design requirements. The pick-up coil assembly 250 is attachable to the auxiliary board 200 and configured to detect motor speed. The variable speed dial wheel 270 is operable by the user in order to set and/or change to the desired motor speed.

Figure 2:
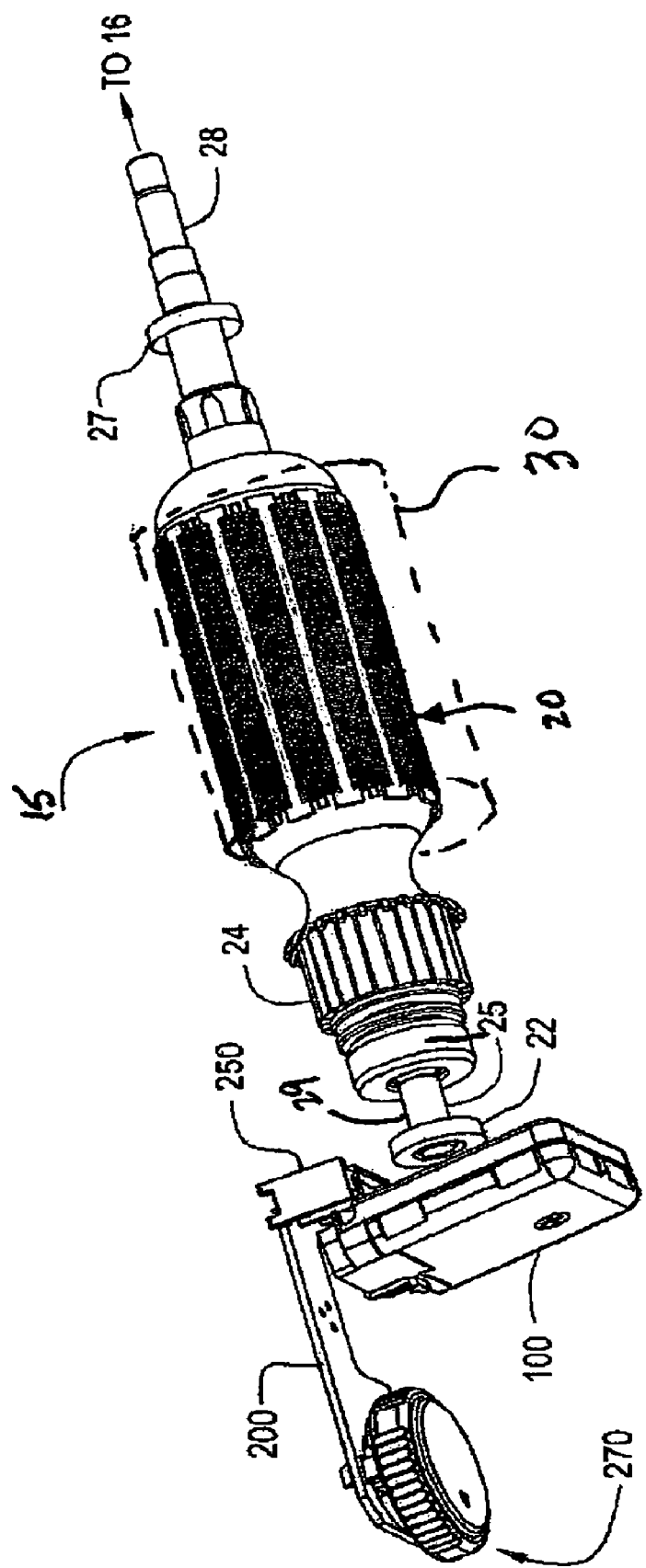
FIG. 2 is an isometric view of selected components of the tool motor within the power tool to illustrate the relation of the control module, pick-up coil assembly, auxiliary board and speed dial, in accordance with an example embodiment.

FIG. 2 is an isometric view of selected components of the tool motor within the power tool to illustrate the relation of the control module, pick-up coil assembly, auxiliary board and speed dial, in accordance with an example embodiment. FIG. 2 illustrates the relationship between the auxiliary board 200 and its components (pick-up coil assembly 250 and speed dial 270), the control module 100 and the tool motor 15, which may be comprised of a tool motor armature 20 rotating within a tool motor field 30. In an example, the auxiliary board 200, pick-up coil assembly 250 and dial wheel 270 may be collectively referred to as an 'auxiliary circuit board assembly. The auxiliary circuit board assembly is attached to the control module 100 of FIG. 1, for example, with the control module 100 being adapted to control operation of the tool motor.

The tool motor armature 20 includes the magnetic collar 22 attachable via armature shaft 29 to the commutator ring 24 of the motor armature 20. The motor armature 20 output is translated to the gear case 16 via ball bearing 27 and spindle 28. Multiple magnets may be provided on the magnetic collar 22 of the motor armature 20. As the armature 20 rotates, the magnetic field from the magnets is picked up by the pick-up coil assembly 250 to give an accurate reading of motor speed. As discussed above, the complete tool motor 15 consists of tool motor armature 20 rotating within tool motor field 30.

The auxiliary board 200 may also include the variable speed dial wheel 270, which acts as a potentiometer as is known in the art. In an example, a portion of the dial wheel 270 may include a plurality of rigid detents which sit on points of a leaf spring, so as to provide aural feedback to the user. In an example, the detents contact the leaf spring to provide a tactile feedback to the user. This also serves to prevent the dial wheel 270 from moving during any tool vibration. Additionally, the use of detents may prevent the user from inadvertently changing speed, providing a readily discernible tactile feedback to the user.

Figure 3:
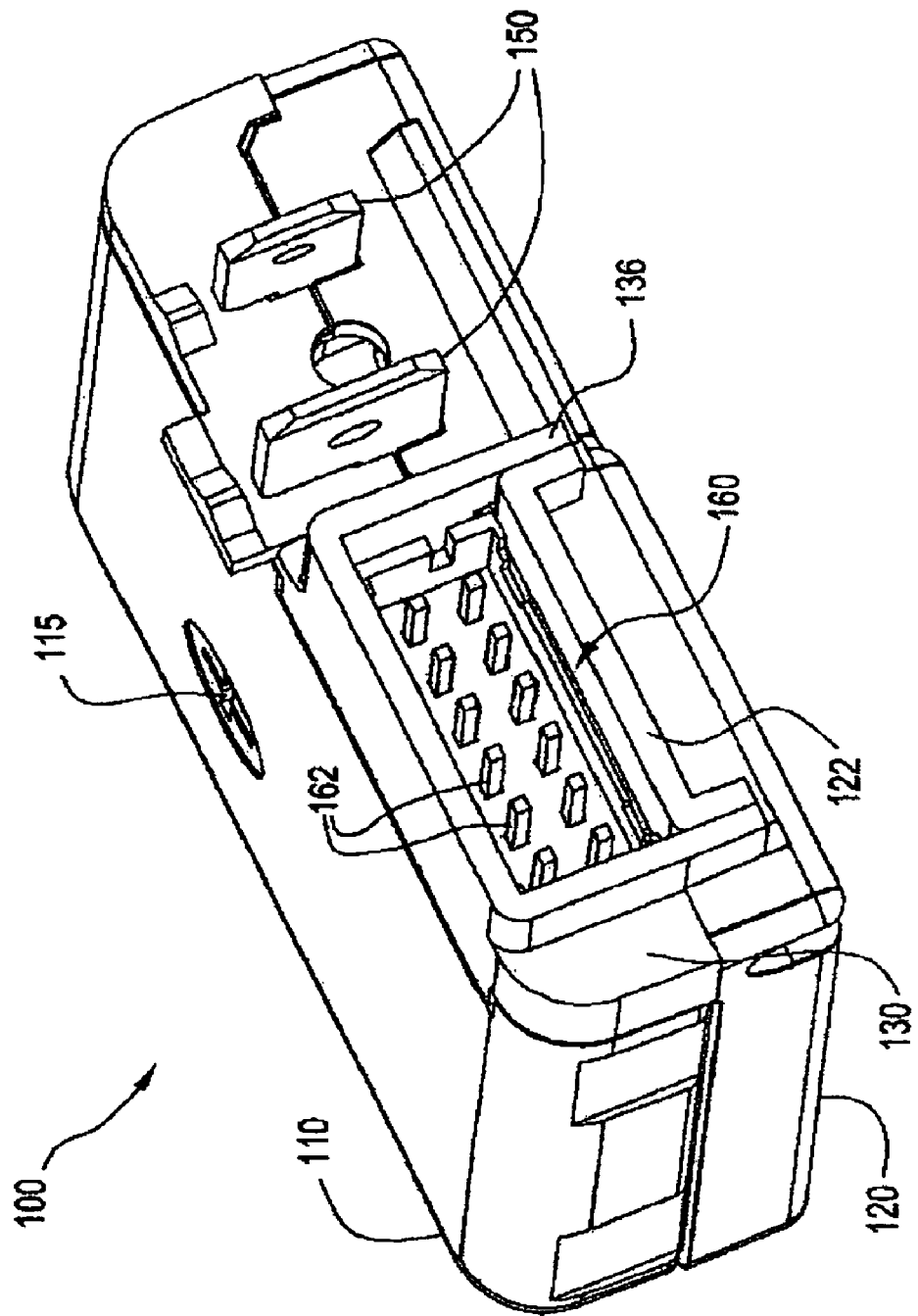
FIG. 3 is an isometric view of the control module in accordance with an example embodiment.

FIG. 3 is an isometric view of the control module 100 in accordance with an example embodiment. Referring to FIG. 3, the control module 100 includes a top cover 110, a bottom cover 120, a spacer 130 and a printed circuit board 140 (not shown in FIG. 3). In one example, the top cover 110 may be made of a material that provides heat sinking for active power components within the control module 100, and may be cast for that function, for example. The bottom cover 120 may be configured to support control module 100 interior components and to permit potting so as to create a sealed enclosure. Additionally, the bottom cover 120 provides an area of electrical insulation for an active power device within the control module 100.

The spacer 130 may be configured to hold through-hole electronic components within the control module 100 in place, such as during assembly of the control module 100. The control module 100 also may include a fastener 115 (e.g., a screw) that fastens the top cover 110 to a nut (not shown) within the module 100. The fastener 115 may be fastened to an active power device such as a switch, a triac, electronic valve, etc., within control module 100. The top and bottom covers 110, 120 may therefore be secured together via a single fastener 115 such as a screw and nut assembly.

The control module 100 also includes a pair of quick-connect power tabs 150 and an input/output connector 160 connected to the printed circuit board 140. The quick connect power tabs 150 are sequenced to the control module 100 and may be of a different size and different length to prevent improper connection to other components, for example. In an example, the input/output connector 160 may be configured in a 12-pin arrangement, in which four (4) pins 162 are empty and not used (to provide spacing), five (5) of the pins 162 may be input/output pins, one (1) pin 162 may be a hot-wire pin and one (1) pin 162 may be a circuit ground/neutral pin. This is merely one terminal pin arrangement for input/output connector 160; other arrangements are foreseeable to the skilled artisan in accordance with the example embodiments herein.

As discussed above, the spacer 130 holds through-hole electronic components in place during assembly of the control module 100. During fabrication, there is a plurality of electronic components attached to the PCB 140. One function of the spacer 130 is to maintain components in place during wave soldering to eliminate hold down fixtures. Accordingly, the spacer 130 may be placed over the power tabs 150 during assembly to provide tolerances and also to provide electrical insulation while maintaining these tolerances between components.

The spacer 130 includes a shroud portion 136 which mates onto a tab 122 of the bottom cover 120 so as to seal and enclose the input/output connector 160. The shroud portion 136 of spacer 130 may be designed to prevent debris and dust shavings from entering the control module 100's active components.

Additional isolation may be provided by potting (not shown) in the spacer 130. In addition to holding active components within control module 100 in place, the potting material may have a V0 flammability rating. Suitable potting materials include but are not limited to one or more of an epoxy-based encapsulant, a single or multi-component urethane or urethane gel encapsulant, a single or multi-component silicon or silicon gel encapsulant, etc.

Accordingly, having potting as an insulator distinguishes the control module 100 with a single layer of isolation versus a non-isolated control module, for example. Additionally, thermal grease may be applied to the top surface of an active electronic component such as a FET or triac within the module 100; this is standard in the industry. In an alternative, a thermal pad (not shown) may be provided instead of the thermal grease. The thermal grease or thermal pad may be used to prevent the potting from seeping between a given active electronic component and the top cover 110, and may be sized as a function of active component height, for example.

Figure 4:
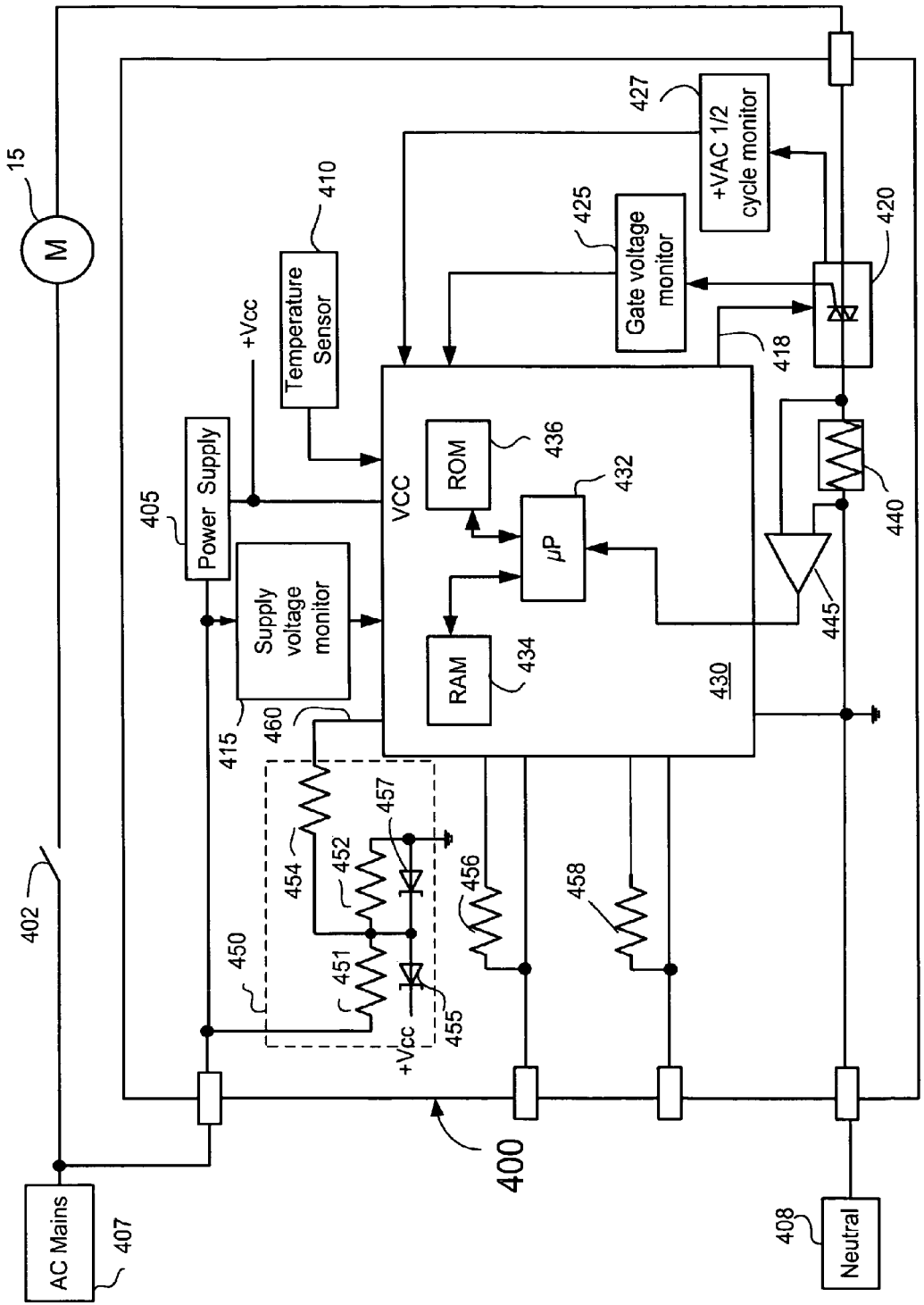
FIG. 4 is a block diagram of an electronic component arrangement within the control module in accordance with an example embodiment.

FIG. 4 is a block diagram of an electronic component arrangement within control module 100. The electronic components described hereafter may be arranged on the PCB 140 within the control module 100. The control module 100 includes memory 434, 436 for storing one or more soft-coded function coefficients used during execution of various functions or algorithms. Since a given soft-coded function coefficient may be specific to a particular tool application, the control module 100 may be suitable for controlling the operation of a plurality of motors and/or for a plurality of different motor applications (e.g. different power tools). The soft-coded coefficients can be understood to include coefficient inputs into a given function or algorithm to be performed by the control module 100, and include function coefficients that may be changed or varied for a given tool or tool application. The The soft-coded coefficients also include coefficient outputs related to a protective action to be taken by the control module 100 as a result of implementing the given function or algorithm performed by the control module 100. Coefficient inputs to, and coefficient outputs from a given function may be changed or linked as desired for a given application. This is illustrated in more detail below in FIG. 12.

Control module 100 is connectable to an AC power source (AC Mains) and the motor armature 20 and tool motor field 30. In an example, the tool motor armature 20 and the tool motor field 30 may comprise an AC motor 15. The control module 100 includes a control circuit, generally indicated by element 400. In one example, the control circuit 400 determines a position of a motor control switch 402 and controls the control module 100 if power is provided to the motor armature 20 and motor field 30 based on the position of the motor control switch 402 when the AC power source is applied.

The control circuit 400 includes a power supply 405 that supplies power to a microcontroller 430 programmed to control certain operations and/or to direct certain functions or protective actions within module 100. The power supply 405 may supply a VCC of 5V for example. A supply voltage monitor 415 monitors the VCC and provides a sensed input to microcontroller 430.

The microcontroller 430 can control the electronic valve 420 by providing controls signals via a control input line 418 to the triac 420. In one example, this may be a triac, although the electronic valve may be embodied as any of a field effect transistor (FET), an insulated gate bipolar transistor (IGBT), a silicone-controlled rectifier (SCR), a voltage control device, etc. Generally, the control module 100 controls the operation of the motor 15 by switching the motor current on and off at periodic intervals in relation to the zero crossing of the AC current or voltage waveform, via the microcontroller 430 and control signals applied to a control input 418 of the electronic valve 420. These periodic intervals are caused to occur in synchronism with the AC waveform and are measured in terms of a conduction angle, measured as a number of degrees.

The conduction angle determines the point within the AC waveform at which the electronic valve 420 is fired, thereby delivering electrical energy to the motor 15. For example, a conduction angle of 180° per half cycle corresponds to a condition of full conduction, in which electronic valve 420 is fired such that the entire, uninterrupted alternating current is applied to the motor 15, i.e., the electronic valve 420 is fired such that current flows through the electronic valve 420 for the entire half cycle of the AC input signal. Similarly, a 90° conduction angle corresponds to developing the supply voltage across the motor 15 commencing in the middle of a given half cycle, and thus the electronic valve 420 is fired so that approximately half of the available energy is delivered to the motor. Conduction angles below 90° correspond to firing of the electronic valve 420 later in a given half cycle so that even lesser quantities of energy are delivered to the motor 15.

Hereafter the electronic valve 420 is referred to as a triac 420, unless otherwise described below. In an example, the triac 420 may be a single-isolated triac, where isolation is internal to the part. More specifically, operation of the motor armature 20 and motor field 30 which constitute the motor 15 is controlled by the control circuit 400 within control module 100. To control operation of the motor armature 20 and motor field 30, the microcontroller 430 controls the current flowing through or voltage applied to motor armature 20 and motor field 30, or both, via electronic cycling of the triac 420. The control circuit 400 can determine when to open or close the triac 420 based on soft-coded coefficients that can be stored in look-up tables, or from control equations based upon measured factors or parameters such as voltage, speed, current, torque, other external inputs (456, 458 etc.) or any combination of the above. The control module 100 controls the operation of the motor 15 when the motor control switch 402 is placed in a closed (i.e., 'on') position, thereby allowing current to flow through. A function of the control circuit 400 is to monitor the position of the motor control switch 402 and prevent starting of the motor 15 if power is applied to motor 15 with the motor control switch 402 in a shut (i.e. 'On') position.

Microcontroller 430 may include program ROM 436 (alterable ROM) such as flash memory, a CPU core such as a microprocessor 432, on-board peripherals, and non-volatile memory such as RAM 434 or SRAM on a single chip construction, for example. The non-volatile memory is adapted to retain stored information even when not powered. Examples of non-volatile memory include RAM (DRAM, SRAM, SDRAM, VRAM, etc.), magnetic and optical-based memory. Types of alterable solid-state ROM may include Erasable Programmable Read-Only Memory (EPROM) and Electrically Erasable Programmable Read-Only Memory (EEPROM). EPROM can be erased by exposure to ultraviolet light then rewritten via an EPROM programmer, and is identifiable by a circular 'window' in the top which allows the UV light to enter. EEPROM such as Flash memory allows the entire ROM (or selected banks of the ROM) to be electrically erased (flashed back to zero) then written to without taking the banks out of the computing device.

In an example, the microcontroller 430 may be one of the ATMEL AVR® 8-bit RISC microcontrollers, such as the ATmega8 flash microcontroller with 8-Kbyte self-programming Flash Program Memory (EEPROM). However the module 100's intelligent control is not limited to the example microcontroller 430. The intelligent control device could be embodied in hardware and/or software as another micropro- cessor, an analog circuit, a digital signal processor or by one or more digital ICs such as application specific integrated circuits (ASICs), for example.

The control circuit 400 with the tool motor 15 (motor armature 20 and motor field 30) is connected in series with motor control switch 402, triac 420 and a shunt resistor 440 between hot and neutral (common) sides of the power source. In FIG. 4, one side of tool motor 15 is connected to the power source, such as to the hot side of AC mains 407 via the power cord 21 (FIG. 1) through the motor control switch 402. The other side of the tool motor 15 is connected through triac 420, shunt resistor 440 and power cord 21 to the neutral side 408 of the AC mains 407.

Shunt resistor 440 may be embodied as an analog current sensor which senses current and provides a signal that is amplified at amplifier 445. Amplifier 445 has a first input coupled to one side of shunt resistor 440 and a second input coupled to the other side of shunt resistor 440. An output of amplifier 445 is coupled to a given port of microcontroller 430. A shunt 440 is merely one example of a current sensor, alternative current sensors include current transformers, digital sensors, hall-effect sensors, etc., for example.

The microcontroller 430 includes an analog to digital converter (ADC) therein which converts the received analog signals from various sensors to digital representations for processing by microprocessor 432. The ADC is not shown in microprocessor 430 for purposes of clarity, it being understood that the analog inputs from amplifier 445, monitors 415, 425, 427, power supply 405, temperature sensor 410 and any analog input data received over additional control input/output lines 456, 458 are converted to digital representations in ADC for processing by the microprocessor 432.

The control circuit 400 further includes a voltage divider circuit 450 having resistors 451, 452, 454, and clamping diodes 455 and 457 utilized by microcontroller 430 to sense one or more zero crossings of the AC voltage. A voltage zero-cross may be defined as the point in time where the AC voltage signal crosses the zero-axis and switches from either positive-to-negative or negative-to-positive voltage. This point is used for timing purposes inside the microcontroller 430. The voltage divider circuit 450 is coupled via a circuit line 460 to microcontroller 430 at a given port (not shown for clarity). The resistors 451, 452 and 454 divide the AC source voltage to a voltage level usable by microcontroller 430. The clamping diodes 455 and 457 protect microcontroller 430 from damage if a voltage spike occurs in the AC source voltage. In an example, all or part of the voltage divider circuit 450 may be included in the control circuit 400 or within microcontroller 430. In one example, the microcontroller 430 may include internal clamping diodes 455 and 457.

Control circuit 400 may include one or more temperature sensors 410 designed to sense a temperature and to input a sensed signal via a port to microcontroller 430. Temperature sensor 410 may be embodied as an NTC or PTC thermistor, temperature sensing IC or thermocouple, for example. The temperature sensor 410 may communicate the temperature of the control module 100, or the temperature of a specific component such as the triac 420 or microcontroller 430, which can be used for determining certain overload events/fault conditions. As the function of such temperature sensors 410 are known, a detailed explanation of its functional operation is omitted for purposes of brevity. Multiple temperatures sensors 410 could be placed in module 100 as required.

Additionally, the control circuit 400 includes two voltage monitors for monitoring voltage of the triac 420, a gate voltage monitor 425 which is used to determine if the triac 420 is conducting during a negative voltage half cycle and a positive half cycle voltage monitor 427 which is used to determine if the triac 420 is conducting during the positive voltage half cycle. Both monitors 425, 427 are necessary since the controller 430 can only detect positive voltages. During the negative half wave of the AC cycle, no voltage would be detected by monitor 427.

The control circuit 400 may include one or more input/output (I/O) lines 456, 458 for communicating with users. These I/O lines 456 and 458 can digital or analog inputs or digital outputs and can be connected to devices such as potentiometers, switches, LED's, or other forms of a user interface (such as a speed dial, tool trigger, on-off switch, etc), so as to add some variability to the system.

In general, the control circuit 400 as illustrated in FIG. 4 is designed to provide tool motor control and/or protection as related to one or more of power tool startup, overload or fault events which exceed one or more of a voltage, speed, current, and torque and/or temperature threshold. The control circuit 400 is designed to implement methodologies to control or provide warning mechanisms which alert a tool user of an impending fault and/or overload condition. Accordingly, as the general structure and electronic circuitry of the control module 100 has been described, example methodologies implemented by the control circuit 400 are discussed in more detail below.

Overload Control

In one example, the control circuit 400 of control module 100 may employ a software-based electronic only clutch (EOC) under control of the microprocessor 432 within microcontroller 430, independently and/or in conjunction with a mechanical clutch in the tool to provide motor overload control. The mechanical clutch may be embodied as the mechanical clutch 1310 shown in FIG. 13B, for example. Hereafter, the mechanical clutch is referred to as 'MC'.

In an example, implementation of an EOC function in conjunction with the microcontroller 430 either turns off the tool motor 15 or reduces the motor voltage to a lower speed and torque value. Further, by employing an EOC in the control module 100 in conjunction with a MC in the gear case 16, a less expensive MC may be used and still have a relatively long lifetime. For example, operational cycles with the use of the combination of EOC/MC may increase cycle life from 200 cycles to more than 2000 cycles. This is only exemplary, use of the combination EOC/MC improves the cycle life of the MC by at least 25%. The EOC functionality detects an overload/fault event as will be discussed in more detail below, upon which the microcontroller 430 removes power to the tool 10 completely by disabling the triac 420, or controls the triac 420 in a way that reduces power to the tool 10.

Although power is lost in the case where the tool is shutdown, inertia still remains in the system. This inertia may cause the motor armature 20 as well as any attached accessory to continue to rotate. This can cause damage to the accessory (such as a grinding disc) as well as gears and other internal components. Using a MC in conjunction with an EOC removes the remaining inertia in the system (such as tool 10) after power is completely cut-off by the microcontroller 430 disabling firing of the triac 420. This combination of EOC turning off current to the motor and the MC removing the remaining inertia in the system acts to increase cycle life of the clutch and/or accessory.

The EOC may be internal to the control module 100 and as discussed above may a software program or routine stored in memory such as alterable ROM 436. For example, either on a half-line cycle or a full-line cycle basis, an algorithm implemented by the microcontroller 430 may continuously monitor a given parameter of the tool, such as current, motor speed, voltage, motor temperature, etc. In one example, the parameter monitored is current; thus as loading increases, current increases. Thus, the microprocessor 432 samples half-cycle positions of the AC current waveform and digitizes the samples in order to calculate a given current value, such as an instantaneous current, an average current and/or root mean square (RMS) current. In another example, the algorithm implemented by the microcontroller 430 may continuously monitor motor speed of the tool motor.

The EOC may be embodied in one example in an absolute clutch mode, in which a threshold such as an average current, RMS current or maximum instantaneous current value (or if motor speed is being monitored, a motor speed threshold) is set. If the calculated or measured current value (e.g., instantaneous current, average current or RMS current) reaches this threshold, the EOC functionality detects a fault or overload condition. In another example, the threshold may be set by microprocessor 432 over a given time duration such as X cycles, in order to avoid transient or spurious protective actions.

Upon this detection, the microcontroller 430 initiates a protective action based on an output coefficient that has been stored in non-volatile memory, which in an example may be embodied as EEPROM or flash memory (as examples of a ROM 436) in FIG. 4. For example, if a particular soft-coded coefficient stored in ROM 436 for the EOC function in the absolute clutch mode is an output to turn the motor 15 off, violation of the threshold will cause the microcontroller 430 to turn the motor 15 off. Thus, the tool 10 may be placed in a shut-down mode where the microcontroller 430 does not allow the triac 420 to conduct any longer. This is accomplished by electronically opening the triac 420 through a control signal that is sent from the microcontroller 430 over a control input line 418 to the triac 420. This turns the triac 420 off; current is not allowed to pass through the motor armature 20 until power is re-applied to the system.

Alternatively, if different soft-sided coefficients are stored in ROM 436 which alter the protective action taken in the absolute clutch mode, violation of the threshold could cause the microcontroller 430 to control the triac 420 so as to pulse the tool motor 15, which would warn the user of a fault condition, or power to the tool 10 may be folded back by reducing the output voltage sent to the tool motor 15.

In another implementation, protective functions such as shutdown, pulsing or foldback may be based on a detected change in current over time by the EOC, i.e., a DI/DT clutch ($\Delta i/\Delta t$). In this example, a change in a current value (such as average current, peak current, or RMS current) is measured over time and if the change in current ($\Delta i$) exceeds a given limit or threshold, one of the above actions (shut-down, pulse, foldback) may be initiated. Thus, an EOC utilized in a DI/DT mode, which is an algorithm iterated by microprocessor 432, can look at N cycles where N=1, 2, 3, etc. In another example, the threshold may be set by microprocessor 432 over a given time duration such as X cycles, in order to avoid transient or spurious protective actions.

Accordingly, the use of an EOC may provide overload control based on exceeding a given threshold in one of the absolute threshold mode or DI/DT threshold mode, where one of several protective actions can take place upon detection of the fault condition by the EOC functionality or algorithm. The microprocessor 432 retrieves certain soft-coded coefficients from memory (such as ROM 436) and executes a particular protective action based on the retrieved soft-coded coefficients. The soft-coded coefficients which direct which protective action to take are referred to as coefficient outputs.

The selected coefficient outputs indicate the protective action to be performed. For example, ROM 436 can include coefficient outputs that indicate that the microcontroller 430 initiate (i) tactile feedback, in which the motor 15 is pulsed by the microcontroller 430 cycling the triac 420 to provide a warning to the user of a fault condition in the power tool 10; or (ii) foldback, in which the microcontroller 430 reduces the conduction angle of the triac 420 to reduce the power to the motor 15; or (iii) motor shut-down, in which the triac 420 is completely disabled as the microcontroller 430 electronically opens the triac 420; or (iv) activation of an electronic brake, where the electronic brake is an algorithm or software routine implemented by the microcontroller 430; and/or one of (i) through (iv) in combination with (v) illuminating a warning LED on the tool housing exterior to alert the user of an impending or present fault condition. These are example protective actions that could be taken upon detection of an overload event by the EOC, for example.

As the EOC is software-based, it has no mechanical parts reducing cost and eliminating wear-out components. The EOC has been described in use with a mechanical clutch; however, it may be used with an electronic brake that behaves similar to a mechanical clutch. The EOC may react to changes in speed or current over time or absolute levels reached by speed or current. For example, an 8 A increase in 32 msec (2 line cycles at 60 Hz) could cause EOC activation. Or, a decrease in motor speed from 8 k rpm to 6 k rpm in 16 msec (1 line cycle at 60 Hz) could cause electronic clutch activation. Absolute level examples of current (35 A) or speed (4,000 rpm) (when no load speed is 10,000 rpm) may cause electronic clutch activation.

The lower speed and torque value behavior is similar to a mechanical clutch. The EOC may be used in combination with a mechanical clutch or an electronic brake.

Figure 5:
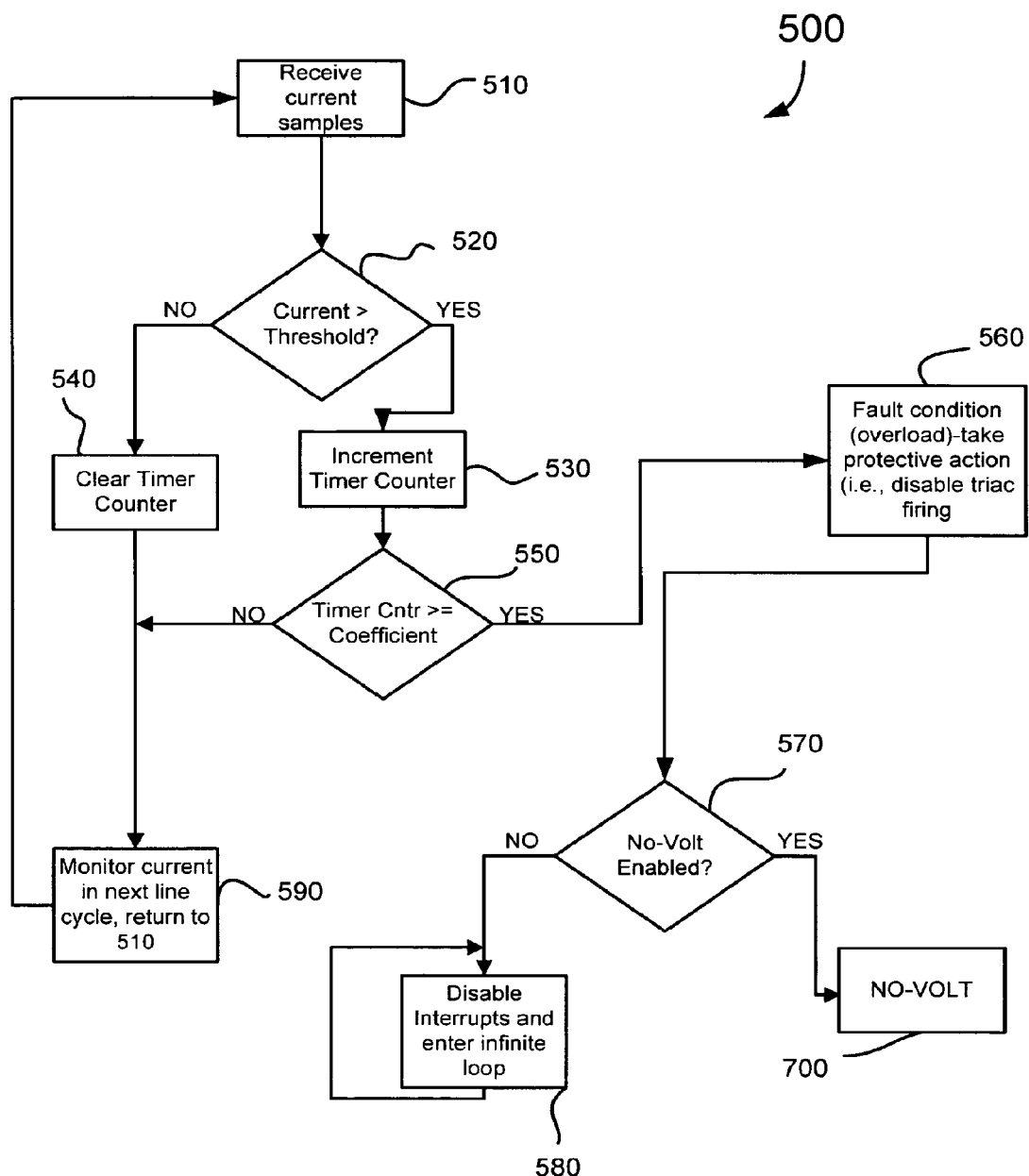
FIG. 5 is a flowchart for illustrating functionality of the absolute clutch mode, in accordance with an example embodiment.

FIG. 5 is a flowchart for illustrating functionality of the absolute clutch mode, in accordance with an example embodiment. FIG. 5 illustrates functionality of the EOC in an absolute clutch mode, which may or may not be used with a mechanical clutch (MC) or electronic brake within the control module 100.

Referring to FIG. 5, in an absolute clutch mode (500), the microprocessor 432 receives a sensed parameter (in this example sensed current samples) (510) from current sensor 440 via amplifier 445. Accordingly, the EOC function in the absolute clutch mode is described as configured to sample current; this is due to the soft-coded coefficients (coefficient inputs) being set in ROM 436 (i.e., EEPROM, flash memory) for current as the input for the EOC function in absolute clutch mode. Of course, the EOC function in the absolute clutch mode could be configured to sample a different parameter, which would be compared to a different threshold other than one based on a current (i.e., voltage, motor speed, motor temperature, etc.) Thus, the coefficient inputs stored in ROM 436 (i.e., EEPROM/Flash memory) could be directed to other parameters as inputs to the EOC function instead of current, such as speed, temperature, voltage or other sensor parameters.

In the present example, these current samples may be samples of half-cycle positions or full line-cycle positions of the AC voltage waveform (i.e., on a line-cycle basis) which are digitized in order to calculate a given current value, such as an instantaneous peak current, an average current and/or root mean square (RMS) current. The calculated current value is compared to a threshold (520), which as discussed above may be a threshold based on an average current, RMS current or max current. If the calculated current value (e.g., instantaneous current, average current or RMS current) exceeds this threshold, (output of 520 is 'YES'), the algorithm increments a timer counter (530); otherwise, the timer counter is cleared (540). The timer counter increment provides a delay to avoid a spurious protection action by the microcontroller 430 for a transient condition.

The timer count is then compared to a timer coefficient (550). If the timer count is equal to or exceeds the timer coefficient (output of 550 is 'YES'); this is indicative of a fault condition as detected by the EOC in the absolute clutch mode.

As shown in FIG. 5, upon detection of the fault condition (here an overload event based on the output of 550 being YES), the control module 100 initiates a protection action. In this example, the microcontroller 430 disables triac 420 firing (560) by sending a control signal via control input 418 (FIG. 4) to electronically open the triac 420 and hence shut the tool motor 15 off.

However, different coefficient outputs for the EOC function could be set in ROM 436 for retrieval by the microprocessor 432 such that the microcontroller 430 takes a different protective action, i.e., using the phase control system of control circuit 400 to invoke tactile feedback or motor foldback, or to simply illuminate an LED on the tool housing to indicate the overload state to the user, for example, rather than opening the triac 420 to removing voltage (and current) from the tool motor 15. For the purposes of explanation in FIG. 5, the coefficient output for the EOC function (absolute clutch mode) is set to motor shutoff by disabling triac 420.

In the absolute clutch mode, the algorithm determines whether a no-volt activation feature is enabled or not (570). As to be described in detail below, the no-volt activation feature may be provided as part of the functionality of the control module 100 in an effort to prevent an attached electrical device (such as a power tool) from turning on either: (a) upon the plug in of the cord of the power tool with the power switch in the "ON" position and the cord unplugged from an AC outlet; or (b) the power switch is "ON" the tool is plugged in and powered, but the tool has reached an overload event that has caused a shutdown (while still plugged in), and the overload event has cleared with the power switch still in the "ON" position.

Implementation of the no-volt activation protection feature ensures that an electronic valve, such as triac 420 within the control module 100, will not fire in one of the above situations (a) or (b). Thus, with the no-volt feature enabled, the microprocessor 432 will initiate a no-volt activation routine 700, as will be described in more detail below. Otherwise, with no-volt activation disabled (the output of 560 is 'NO'), the algorithm disables interrupts at 580 and enters an infinite loop. This prevents the triac 420 from firing, e.g., the algorithm runs the same instruction over and over.

The action of either running the no-volt activation routine 700 or entering the infinite loop (at 580) will only occur if the soft coefficient output is set to shut down the motor 15 in the event of an absolute clutch mode fault. As described earlier, the soft-coded coefficients include coefficient outputs related to a protective action to be taken by the control module 100 as a result of implementing the given function or algorithm performed by the control module 100. Coefficient inputs to, and coefficient outputs from a given function may be changed or linked as desired for a given application. Thus, if some other coefficient output is set which does not require motor shutdown, i.e., foldback, tactile feedback, LED, etc., a separate action will occur.

If the timer count from 530 is less than the timer coefficient (output of 550 is 'NO'), the normal iteration of the absolute clutch mode proceeds with monitoring current samples in the next line cycle or half-line cycle (590), and the algorithm proceeds back to 510.

Figure 6:
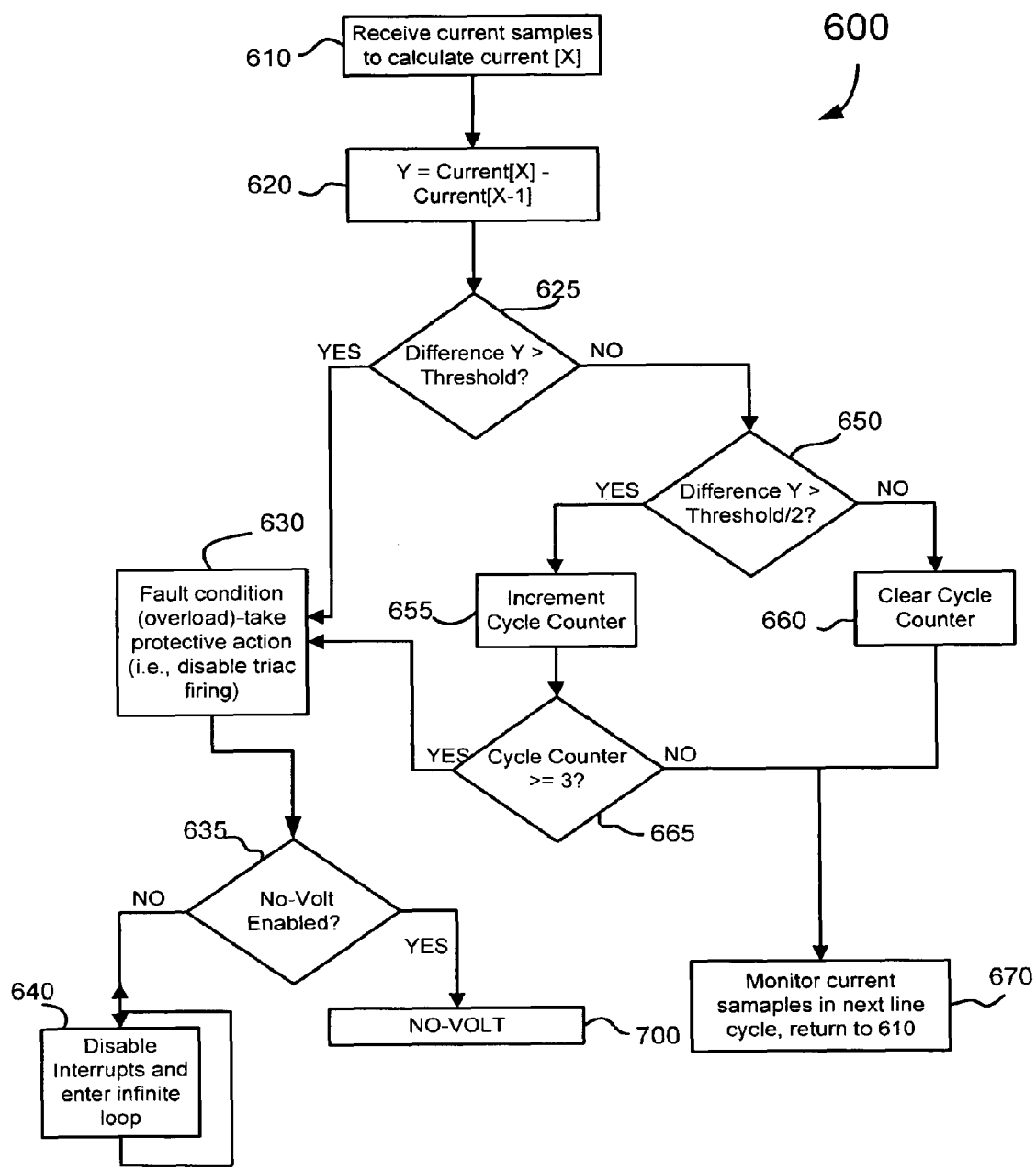
FIG. 6 is a flowchart for illustrating functionality of the DI/DT clutch mode, in accordance with an example embodiment.

FIG. 6 is a flowchart for illustrating functionality of the DI/DT clutch mode, in accordance with an example embodiment. FIG. 6 illustrates functionality of the EOC in a DI/DT clutch mode, which may or may not be used with a mechanical clutch (MC) or electronic brake within the control module 100. Referring to FIG. 6, in the DI/DT clutch mode (600), the microprocessor 432 receives sensed parameters. In this particular example, the parameters are current samples (610) from current sensor 440 via amplifier 445, it being understood that the sampled parameters could be motor speeds of the tool motor at two separate timings motor These may be samples of half-cycle positions or full line-cycle positions of the AC voltage waveform (i.e., on a line-cycle basis) which are digitized in order to calculate a given current value, such as an instantaneous peak current, an average current and/or root mean square (RMS) current, for example.

The algorithm implements a difference function (620) to calculate a difference value. In this example, the calculated current from the previous line cycle (Current(X−1)) is subtracted from the calculated current value for the present line cycle (Current(X)). The difference value is compared to a set threshold (625), which as discussed above may be a threshold based on an average current, RMS current or max current. If the difference value exceeds this threshold (i.e., the output of 625 is 'YES'), the algorithm determines whether a no-volt activation feature is enabled or not (630). Functions 635, 640 and 700 may be implemented as described in FIG. 5, thus a detailed explanation is omitted for purposes of brevity.

Although current is being used in the example of FIG. 6, it would be evident to use another parameter such as motor speed, and a threshold based on motor speed, in order to determine whether a fault condition has been detected so as to initiate a protective action. Accordingly, in another example a difference value can be determined for motor speed at two different timings.

If the difference value is less than or equal to the threshold (i.e., the output of 625 is 'NO'), the algorithm compares the difference value to the threshold divided by a factor (650), which in the example of FIG. 6 is threshold/2. If the difference value exceeds the threshold (i.e., the output of 650 is 'YES'), a cycle counter is incremented (655) by the microprocessor 432; otherwise, the cycle counter is cleared (660). In an example, a fault condition such as an overload event is detected if the difference value exceeds threshold/2 for at least N consecutive line cycles, where N is ≧2.

The cycle counter increment provides a delay to avoid a spurious protection action by the microcontroller 430 for a transient condition. From function 655, the algorithm as shown in the example of FIG. 6 determines whether the cycle count is equal to or exceeds 3 (at 665), indicating that the difference value from 650 has exceeded the threshold for 4 consecutive line cycles, it being understood that this is merely one example, this count could be sent to 2, 3, 4, N as needed to trigger a protective action for motor overload. In other words, three consecutive difference values exceeding threshold/2 will span 4 line cycles. In this case, no-volt activation is evaluated as described above in functions 630, 635, 645 and 700. The output of functions 660 and 665 returns the microprocessor 430 to normal operations 670 where the DI/DT clutch mode proceeds with monitoring current samples in the next line cycle or half-line cycle.

The purpose of comparing the difference value to a threshold divided by a factor over multiple line cycles is to help predict the occurrence of an overload event before it happens. For example, if the difference threshold is set to a 30 amperes average between two consecutive line cycles, the measured average current will also be compared to 15 amperes (30/2) between consecutive cycles. If this occurs multiple times in a row, even though the current has not exceeded 30 amperes, this is still considered an overload event.

The use of a combination EOC/MC may have certain benefits. For example, in a cutting application, if a piece collapses on the cutting wheel, the EOC will turn off the motor 15 (i.e., the motor armature 20 and motor field 30) immediately. Shortly thereafter, the mechanical clutch will slip after the EOC shuts off the power, dumping any remaining inertia. This may prevent tool 10 destruction or prevent gears from breaking or coming apart, for example.

No-Volt Activation

Figure 7:
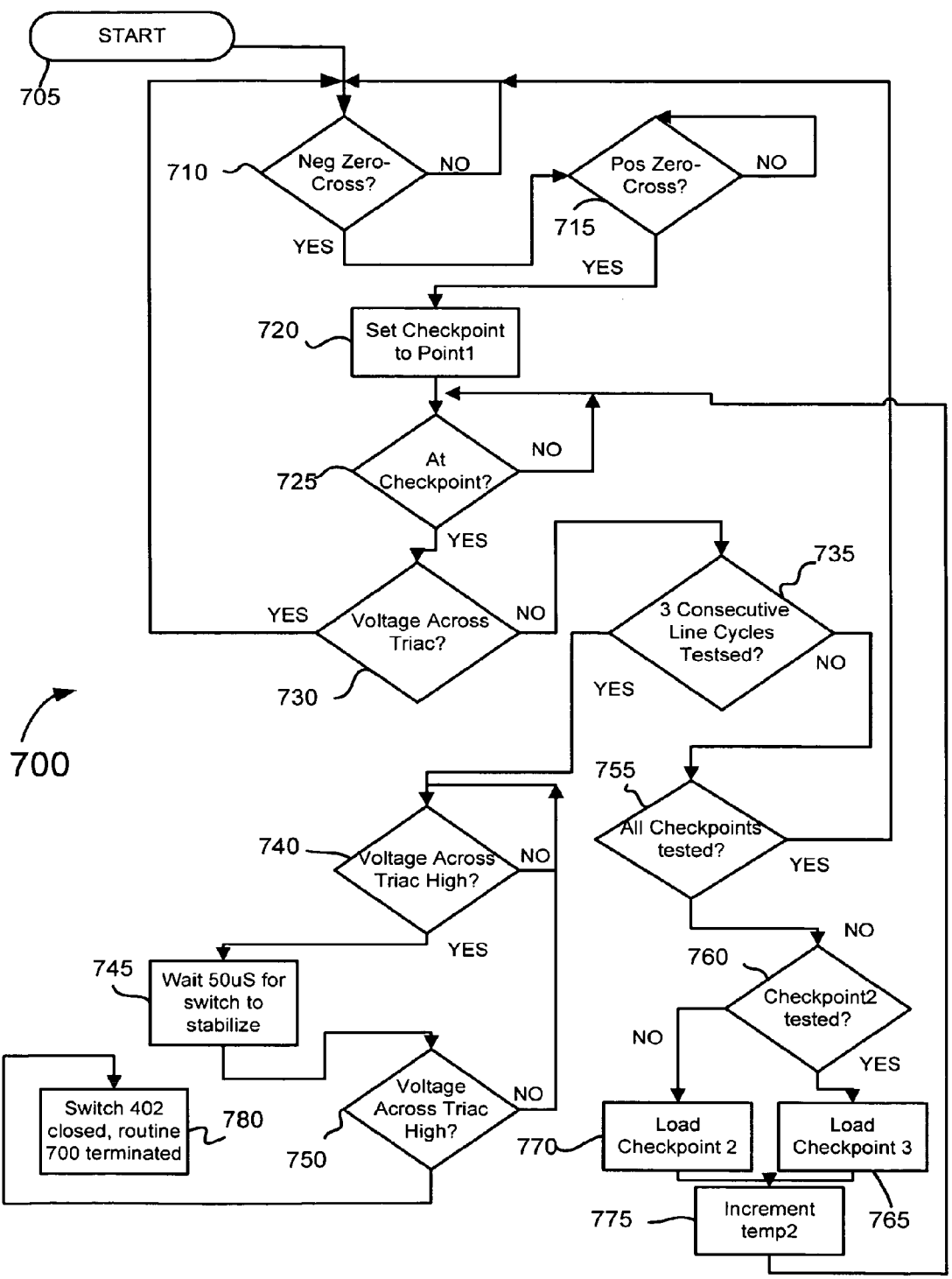
FIG. 7 is a flow chart illustrating a no-volt activation routine in accordance with an example embodiment.

FIG. 7 is a flow chart illustrating a no-volt activation routine in accordance with an example embodiment. As described above, the no-volt activation routine may be provided as part of the functionality of the control module 100, so as to prevent an attached electrical device such as a power tool from turning on either: (a) upon the plug in of the cord 21 of the power tool 10 with the power switch in the "ON" position and the cord unplugged from an AC outlet; or (b) the power switch is "ON" the tool 10 is plugged in and powered, but the tool 10 has reached an overload event that has caused a shutdown (while still plugged in), and the overload event has cleared with the power switch still in the "ON" position. The implementation of a no-volt activation protection routine may prevent an electronic valve, such as the triac 420 within the control module 100, from firing in one of the above situations (a) or (b).

In one example, a series of consecutive voltage checks may be made at 90° phase positions of the AC waveform in each line cycle, in order to look for voltage across the triac 420 immediately after the control module 100 receives power. If the tool switch 402 is closed when power is applied, the microcontroller 430 will detect a presence of voltage across the triac 420. If the switch 402 is open when power is applied, the microcontroller 430 will not detect any voltage across the triac 420. If there is an indication of AC voltage at these checks, the triac 420 will not fire until there is an indication of no voltage in a given line cycle, i.e., the user has cycled the power switch to "OFF" prior to restarting the power tool 10. Multiple consecutive checks are required to eliminate any random noise in the system due to electrical spikes, surges, suppressions etc. which can cause brief periods of voltage across the triac 420.

In the example of FIG. 5 above, the microprocessor 432 of the microcontroller 430 compares current feedback to a threshold (at 520) for the EOC. If the EOC is configured with an absolute threshold and the feedback current value exceeds the threshold, two actions could occur. In a case where no-volt protection is not activated in a system (disabled/inactive, output of 560 is 'NO'), the algorithm (under microprocessor 432 control) disables interrupts in an infinite loop (at 580) to prevent the triac 420 from firing, and stays in this loop to effectively shut-down the power tool 10. Thus, all power to the tool motor 15 is terminated.

If the no-volt activation routine is enabled in the control module 100 (output of 570 is 'YES'), the microprocessor 432, in iterating the functions of the no-volt activation routine 700, looks for whether the switch 402 is opened or closed. In this example, the no-volt activation methodology does not disable the interrupts, but triac 420 firing is disabled (at 560) based on the no-volt methodology of FIG. 7.

In the example of FIG. 6, the microprocessor 432 measures current over time and stores the current values in RAM 434 for past and current cycles. In one example, the algorithm as iterated by microprocessor 432 calculates a DI/DT value as a change in instantaneous current divided by the cycle time (DI/DT=$I_2$–$I_1$/ΔT). This DI/DT value or difference value, which may be referred to as a variable Y, may be compared to the threshold. If Y exceeds the threshold (output of 625 is 'YES'), the same protective action sequence (630, 635, 640/700) may be initiated by microprocessor 432 as for the absolute threshold scenario of FIG. 5; otherwise Y may be compared to a factor of the threshold such as threshold divided by 2 (at 650).

If Y is greater than the threshold divided by 2, then a counter may be incremented up to 3 or 4 times (655, 665) to confirm that no spurious event is taking place. On the other hand, if Y is less than the threshold divided by 2, then the counter is cleared (660). Should the counter reach 3 or 4, the counter is set and the same protections (630, 635, 640/700) are performed as in the absolute threshold scenario described above. For example, if the counter equals 3, this indicates that 4 consecutive line cycles of data have exceeded the reduced threshold value of the threshold divided by 2.

Referring now to FIG. 7, one of the situations (a) or (b) described above triggers initiation (705) in which the algorithm detects (at 710) whether the AC voltage waveform is at a negative zero cross (i.e., voltage half-cycle is crossing through zero to the negative half cycle). This is a synchronization step for the algorithm as it waits for the zero cross, and will loop until a negative zero cross is detected. Once the positive zero cross is detected the microprocessor 432 of controller 430 can start checking the position of the switch 402 (715). This synchronization to the positive half cycle is only necessary if the controller 430 can only sense voltage in that particular half-wave. However, sampling during the negative half is possible using the other voltage monitoring circuit 425.

Once both zero crosses are detected (output of 715 is 'YES'), a checkpoint value is set to phase point 1 (720). Phase point 1 may be at 130° conduction angle of the triac 420, or based on a given time (100 msec). Function 725 is a looping process until it is determined that the checkpoint has been reached, upon which the voltage across the triac 420 is checked (730). Sampling voltage across the triac 402 is used in this example, it being understood that this is merely one example parameter that could be checked; current through the triac 402 may be the sampled parameter instead of voltage. If some positive voltage is detected at 730, it is assumed that the switch 402 is closed. The routine then returns to function 710 and repeats not allowing the triac 420 to conduct, otherwise there is no voltage detected across the triac 420.

In this case (output of 730 is 'NO'), the algorithm queries whether a given number of N consecutive line cycles (N≧2) of the voltage waveform have been tested. In the specific example of FIG. 7, the algorithm queries whether three consecutive line cycles of the AC voltage waveform have been tested (735). If YES, it is determined whether voltage across the triac is high (at 740) and if so, the algorithm inserts a delay at 745 to wait for the switch 402 (which also may be referred to as a trigger or ON/OFF switch) to close. If voltage across triac 420 is still high after the wait time (output of 750 is 'YES'), switch 402 closes and the no-volt activation routine 700 is terminated at 780; the power tool 10 may be turned on for normal operations. Functions 740, 745 and 750 thus address a situation where the tool 10 has shutdown due to some overload condition, but where switch 402 is still ON.

If, on the other hand, three consecutive line cycles of the AC voltage waveform have not been tested, the algorithm queries (at 755) whether all checkpoints have been tested. This routine can have multiple checkpoints per line cycle. The more checkpoints tested, the more immune the system is to random noise. For example, if there are three separate checkpoints at 130, 70 and 30 degrees of conduction, and these three points have been checked for three consecutive line cycles, and then the routine effectively guarantees that the switch 402 is in fact open at nine consecutive discreet points along the AC sine wave. If only a single discreet point is checked, noise could adversely influence the system.

Thus, if the output of 755 is YES, the algorithm returns to checking the negative zero cross of the next line cycle at 710. If not all checkpoint were tested, then it is determined whether checkpoint 2 has been tested (at 760), and either checkpoint 2 is loaded (770) or checkpoint 3 is loaded 765 based on the determination at 760. Thereafter an AC cycle counter (temp2) is incremented at 775, and processing returns to the checkpoint test at 725. This AC cycle counter (temp2) is how the microcontroller 430 knows that all three consecutive cycles have been tested. If at any checkpoint no voltage is present across the triac 420, the microcontroller 430 assumes the switch is closed and restarts the entire routine at 705.

The above example has been described where the parameter being sensed is voltage across the triac 420 in order to determine if the switch 402 is either open or closed. However, instead of checking voltage, checks of current (i.e., average, RMS, peak current, etc.) during the AC cycle may be performed. If current is determined as flowing through the triac 420, it can be assumed that the switch 402 is closed; otherwise, no current is detected and the switch 402 is open. Again, multiple checks can be performed across multiple AC cycles to increase noise immunity during detection as described above.

Service Required Algorithm

In another example, the microprocessor 432 may iterate a service required algorithm in order to indicate whether power tool 10 service is required. An example required service may be to replace the brushes in the tool motor 15, or to re-apply grease to the gears in gear case 16. Power tools may use universal motors with commutator brushes. For example, the commutator ring 24 of FIG. 1 may have commutator brushes thereon. These brushes typically require replacement before the end of life of the tool. Determining when to replace brushes may be based on a threshold coefficient which is set through time calculation, motor current measurement, applied motor voltage, speed, switch cycles, or some combination of these parameters. Indication of service required to the user may be performed through a light indicator on the tool housing 18 such as an LED. Alternately, the user may be alerted to a required service by tactile feedback at some particular vibratory pattern, or the tool may be set to shutdown until the service is complete, for example.

In one example, and upon start-up of the microprocessor 432, the microprocessor 432 calculates how long the tool 10 has been running and compares it to the threshold coefficient. In this example, the threshold coefficient may be set based on time, such as 100 hours. If the tool run time has exceeded 100 hours, a light indicator on the tool housing 18 such as an LED (not shown) may illuminate to alert the user that service is required. The LED may remain "ON" until reset at a service center or by the user, for example.

In this example, the required service is brush replacement. After brush replacement has been performed one of several methods of indicator reset may be used. For example, in order to reset the threshold coefficient, a service center representative or the user may physically remove the brushes and power the tool 10. As no brushes are in the tool, there is no detection of current, thus the microprocessor 432 detects a low current (i.e., a low current as compared to a threshold) and assumes the "no-current" reading. If no current is sensed for at least one second, the microprocessor 432 may implement a reset routine. In one example, the reset routine may include multiplying the threshold coefficient (100 hours) by some factor (such as 2) and/or extending it for a fixed or variable reset period. As the new service required run time is set, the LED is de-energized and the brushes are replaced back into the tool motor 15.

In another example, an external reset may be used. The brushes are replaced then the tool is plugged into an external reset module that is powered. Then, power is applied to the tool and the tool switch is activated. The reset module limits motor current to a very low value, low enough that the motor does not turn. The controller 430 recognizes this as a service required reset command and resets the indicator. The external reset module could be used at the service center or purchased by the tool user.

In another example, a code may be input from the tool user. After brush replacement, the tool is powered. This code input may be combinations of speed dial settings, variable speed switch settings, switch cycles within a period of time, etc. In other words, this code can be a sequence and/or timing of operations or activations of user inputs to the tool control. For example, a drill reset may require the user to activate the power switch on/off 5 times in 10 seconds, wait 10 seconds, and then re-activate the power switch on/off 5 times in 10 seconds to implement the reset.

Tactile Feedback

Figure 8:
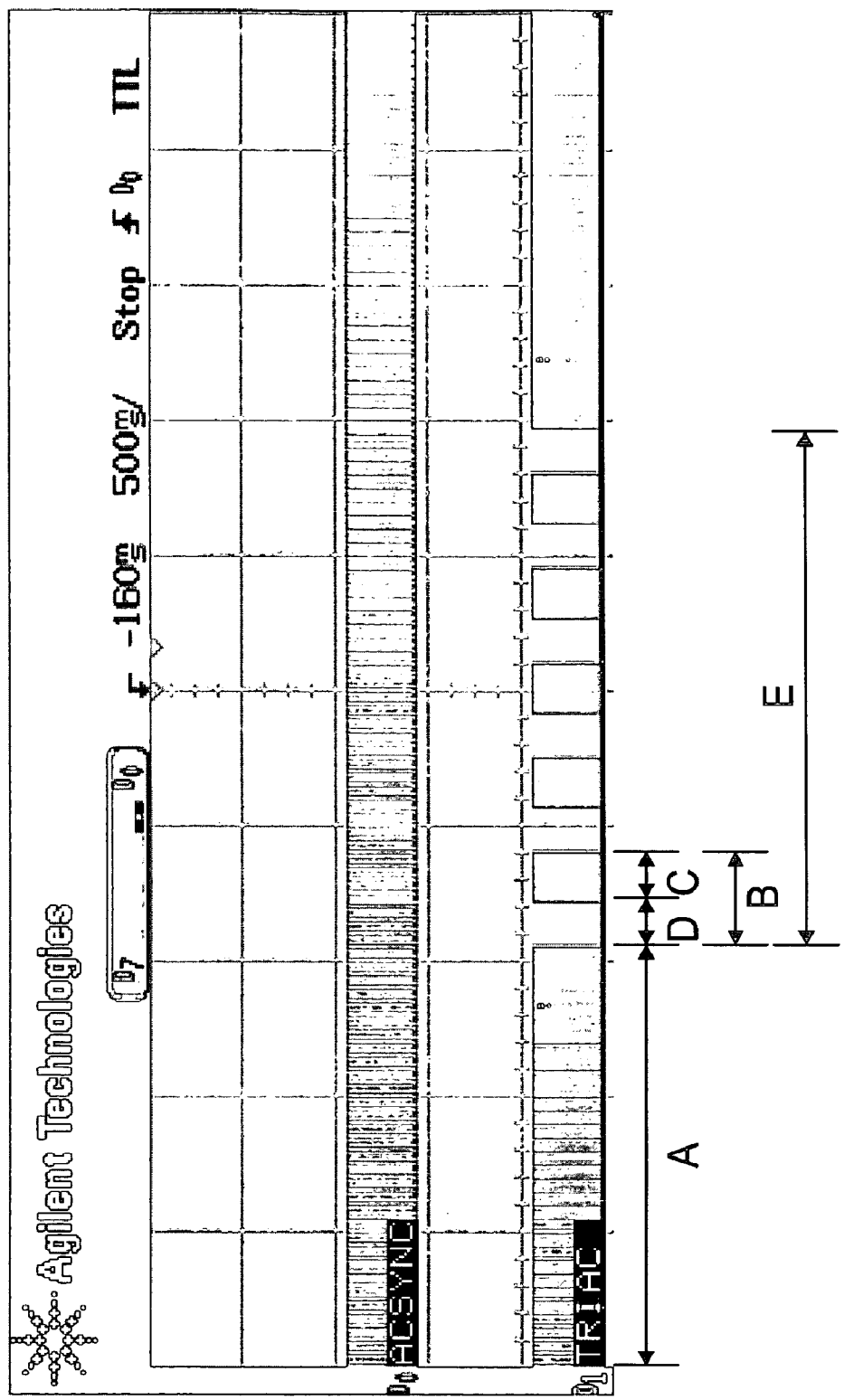
FIG. 8 is a graph to illustrate tactile feedback to a power tool user as a warning mechanism of an impending or present fault condition therein.
Figure 9:
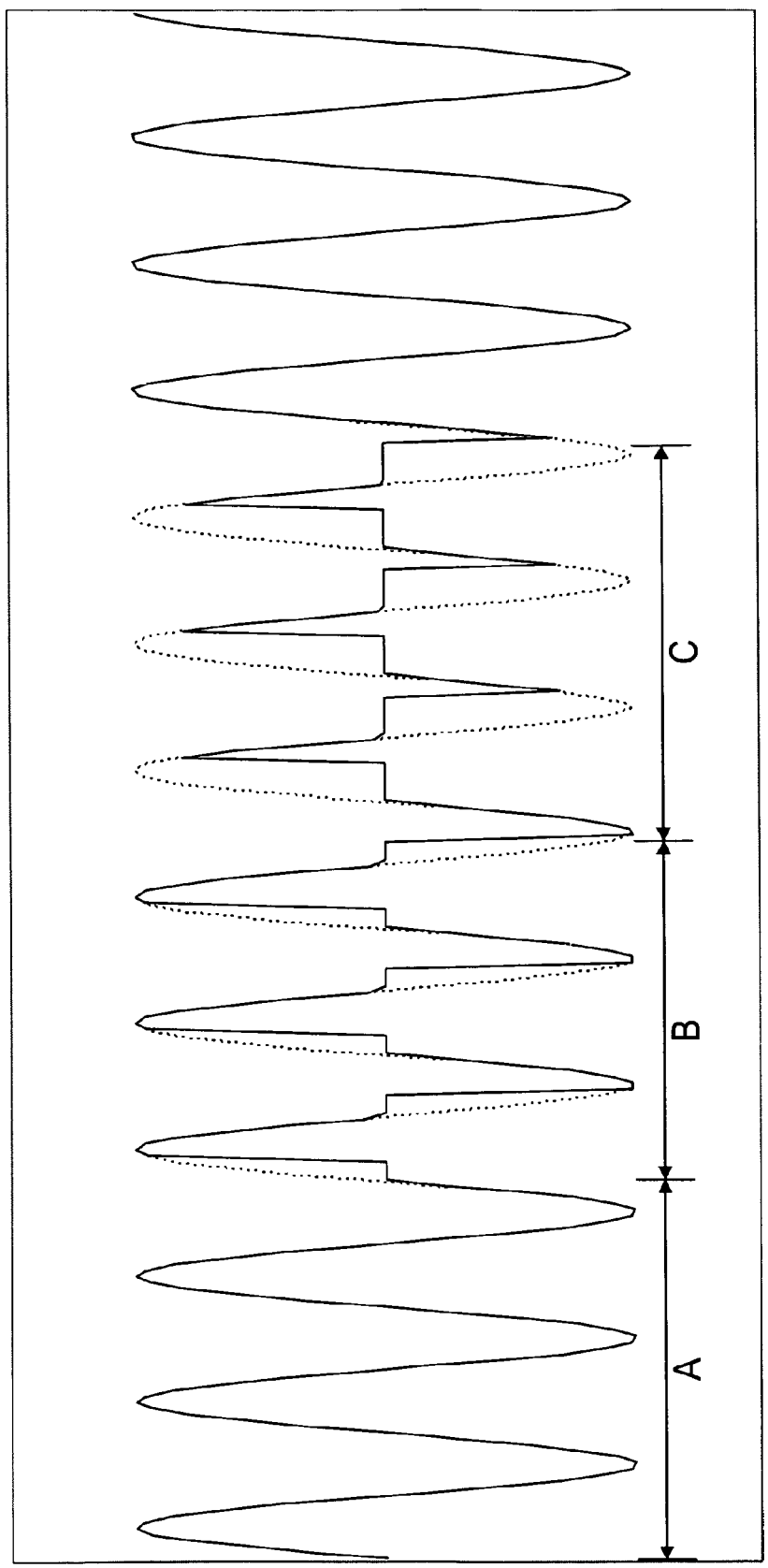
FIG. 9 is a graph to illustrate foldback of motor voltage in a power tool.

FIGS. 8 and 9 are graphs to illustrate tactile feedback to an AC corded power tool user as a warning mechanism of an impending or present fault condition therein. Before shutting down the power tool 10 for some fault condition, or as opposed to shutting down, it may be desirable that some kind of warning be provided to the operator of the power tool 10. Similar to a scenario when a fault condition occurs, or is in the process of occurring, in an owner's car, the owner may be given a warning light on the dashboard for a given duration of time before the engine breaks down because of the fault condition (i.e., piston damage due to a lack of oil).

In one example, a detected under-voltage and over-temperature condition could be used as a cut-off mechanism, i.e., the control module 100 ceases to output current once a threshold is reached. However, before a fault condition trigger such as an under-voltage or over temperature threshold is reached, a warning mechanism in the tool 10 may warn the operator that the operator is approaching an impending operating limit that may automatically shutdown the power tool 10. The warning mechanism could be audible (with a horn or buzzer) or visible using a desired illumination scheme such as LEDs, for example.

Commonly assigned U.S. Pat. No. 6,479,958 to Thompson, et al. describes a method of breakthrough torque control for a power tool. In one example in the '958 patent, power tool control may be provided by sensing a given motor parameter which is indicative of the onset of some fault condition, such as a stall condition. In response to the impending stall condition, while the power switch to the tool remains active, the motor is pulsed a number of times at a frequency that is harmonically related to the natural resonant frequency of the motor. This is done in order to deliver a series of torque pulses which have a peak torque that is greater than the average torque delivered during the series. This is called "breakthrough torque", and allows a user of a power tool to finish a given job so that the motor does not burn out or stall completely.

However, in another configuration as to be described herein, the motor 15 may be pulsed not using breakthrough torque to complete a job, but as a warning for a user of the tool 10 that the tool 10 is approaching or at an impending fault (i.e., shut-down or stall condition). In an example, the pulse may be customized for a given power tool. The pulse acts as a physical, tactile sensation or warning mechanism to the user.

Thus, as the control module 100 is a phase-controlled, time-based system, any logic may trigger an output pulse as a warning mechanism. For example, parameters such as a given speed, torque, temperature, current or change in current over time are parameters which can be measured by the microprocessor 432 and compared to some threshold in order to initiate tactile feedback, whereby the tool motor 15 is pulsed on reaching or exceeding a given threshold.

FIG. 8 illustrates a result of tactile feedback in which the triac 420 drops from full "ON" to full "OFF". Referring to FIG. 8, area A shows the triac 420 firing at full conduction (i.e., the microprocessor is maintaining the conduction angle at 180 degrees for full conduction). A pulsing period B consists of a series of "ON/OFF" firings of the triac 420. The triac 420 is "ON" for a time period C and "OFF" for a time period D. The period C+D represents one period B. Period B then repeats a set amount of times E. Accordingly, FIG. 8 is provided to illustrate tactile feedback with full "ON/OFF" pulsing.

In another example, tactile feedback may be implemented with a varying conduction angle. Referring to FIG. 9, the pulse diagram illustrates the result of tactile feedback in which the triac 420 can drop from a higher conduction angle down to a lower conduction angle or from a lower conduction angle up to a higher one, instead of full "ON/OFF". Once the microprocessor 432 of controller 430 detects that then the control module 100 should pulse the output, the microprocessor 432 can either decrease the conduction angle from full at point A down to a lesser conduction angle at points B or C or can increase the conduction angle from a low point such as C and increase the conduction up to point A (full on). This implementation may utilize the same coefficients as in FIG. 8 during full "ON/OFF" tactile feedback. Accordingly, parameters such as duty cycle (ratio of parameter D to C in FIG. 8), pulsing time (parameter E in FIG. 8), non-pulsing time (parameter A in FIG. 8) etc. may be varied as desired for a given power tool or application.

In one example, alerting the user of an impending fault condition in the power tool 10 can utilize the phase controlled nature of the control module 100 to setup soft coded parameters in ROM for tactile feedback (A, B, C, D, E of FIG. 8) to create a "warble" effect in the speed of the motor 20. This mild cyclic change in motor speed may be selected so as to not adversely affect tool performance but provide the user with both audible and tactile feedback on the impending or current fault condition.

Foldback

In general, the control circuit 400 in the control module 100 may be configured to reduce the maximum power output capability of the tool 10 so as to produce a "old back" condition. The operator would both hear and feel this condition as a 'weakening' of the tool 10 performance. The operator would be prompted to back off and avoid an impending fault condition (e.g., under-voltage, over-temperature, over-current, etc.).

For example, foldback could be implemented based on motor temperature exceeding a given setpoint or threshold. Upon reaching a fault condition (over-temperature limit, setpoint or threshold) the controller 430 issues control signals via signal input line 418 to reduce the conduction angle at which triac 420 fires in proportion to the increase in temperature. This lower conduction angle is held to reduce motor voltage applied to the tool motor 15 as temperature rises past the threshold or set point.

In this particular example, foldback is intended to protect the motor 15 and inform the user when the tool 10 is too hot. If temperature continues to increase, motor voltage continues to decrease until either the motor voltage becomes 0 or a minimum voltage is reached and the voltage no longer decreases with increased temperature. By folding back motor voltage, temperature should begin to decrease below the threshold or setpoint, at which motor voltage may again be increased.

The foldback function may be maintained until the temperature has reduced below the setpoint, or the temperature no longer decreases, or a low tool speed setting has been reached.

Foldback may be employed by controller 430 as a protective action for violations of inputs other than temperature. Foldback may be employed to reduce torque or to assist with user loss of control (e.g., tool rotating about the bit tool or accessory).

FIG. 9 is a graph to illustrate an example of foldback of motor voltage in a corded AC power tool. Initially, when a given measured parameter (voltage, current, temperature, torque, etc.) of the system is below some coefficient threshold, the triac 420 is firing at full conduction (point A). As the parameter increases above this threshold, the conduction angle begins to decrease (from point A to point B). If the parameter being measured continues to increase further above the threshold, the conduction angle will continue to decrease (point B to point C). This process will continue until either some set minimum conduction angle is reached (an example being 30 degrees). This minimum conduction angle is held constant until the measured parameter decreases. Alternatively, the module 100 may be configured to shutoff the tool 10 after this set minimum conduction angle is reached. If the triac 420 is firing at point C and the measured parameter begins to decrease, the conduction angle will then increase from point C back to point B. As the measured parameter continues to decrease below the threshold, the conduction angle will continue to increase from point B back to full conduction at point A.

Torque Control

The control module 100 may be configured to provide torque control for the tool motor. Torque control may be somewhat analogous to speed control, for example. On a cycle-by-cycle basis, the microprocessor 432 reads the current value off the shunt 440 and compares it to a reference voltage in order to determine a representative voltage reflective of the current value. The representative voltage value, as compared to one or more values, that may be stored in a suitable look-up table within memory 434 or 436 or determined with a hard-coded equation in order to determine the torque value. The calculated or looked-up torque value may then be compared to a torque set point. If the calculated torque value exceeds the torque set point, the microprocessor 432 regulates torque by reducing the output voltage. This can be done using foldback, for example. In one example, a microprocessor 432 can change the conduction angle at which the triac 420 fires, which changes the motor voltage to reduce the torque value below the torque set point.

Motor Temperature Estimation

Figure 10A:
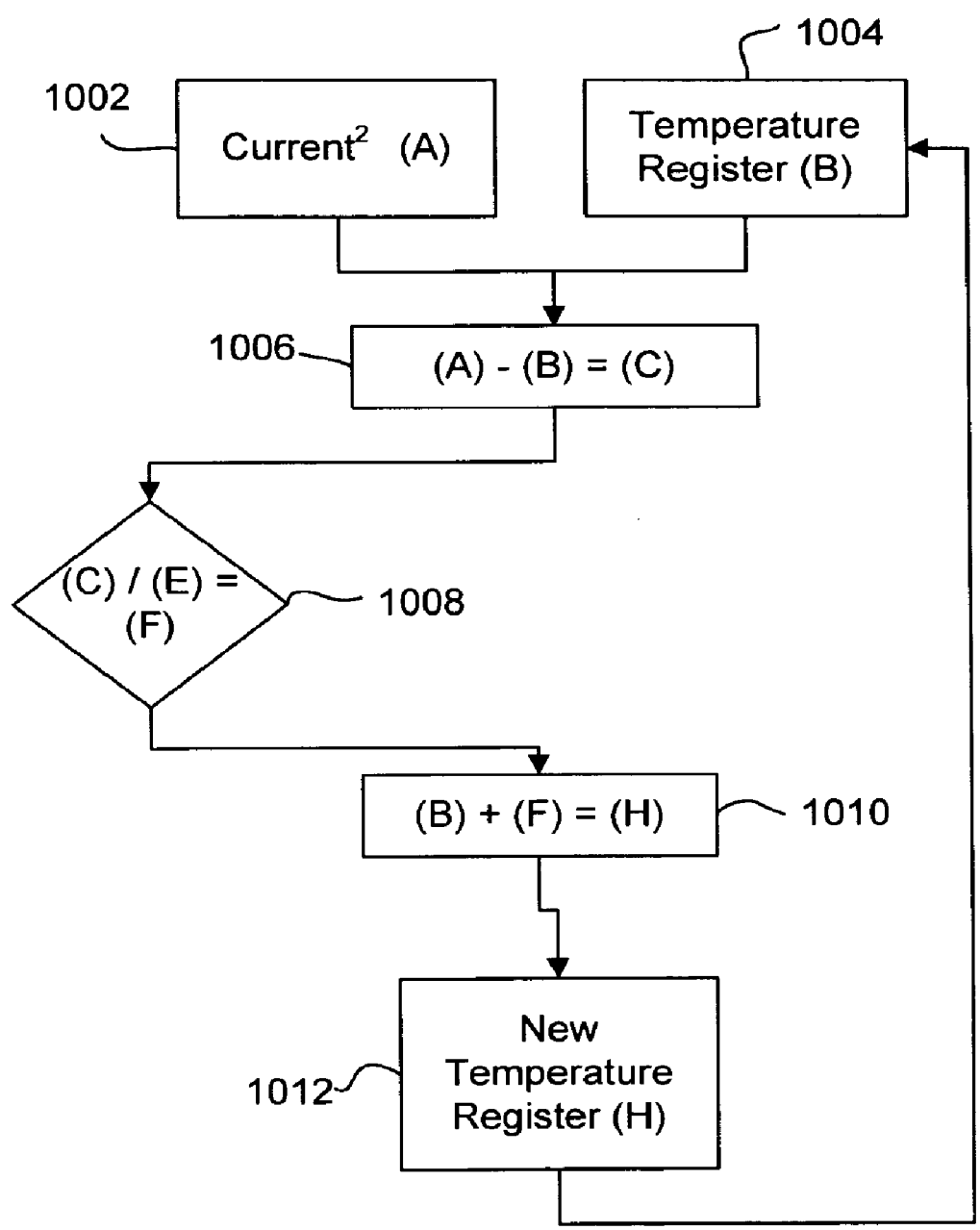
FIG. 10A is a flow diagram illustrating a motor temperature estimation algorithm in accordance with an example embodiment.

FIG. 10A is an overview of a motor temperature estimation algorithm. This example uses average current as an input, but other measurements such as RMS current, peak current, temperature from thermistors or thermocouples, or speed can be used as an input to a motor temperature estimation function.

The algorithm is based on a principle that the temperature of a motor is proportional to the square of the RMS current times resistance. Assuming resistance is constant in the tool motor 15, estimating temperature can be accomplished by accurately measuring current over time. Initially, n current samples are taken by microcontroller 430 at specific intervals over a period of time or time increment M (n and M can be varied for each tool 10) to determine an average current which is squared at 1002. This squared value of current can be represented as an integer parameter A. The squared current term A represents an estimate of what the motor temperature will be at the end of a given time period P into the future (where P is much greater than increment M), assuming that the current remains constant.

The term A is to be compared to a temperature register value B (shown input at 1004). B is a fluctuating value representing an estimate of the motor temperature at a present point in time, and which is to be updated at each time increment M. For instance, a temperature register value B=0 indicates that motor temperature is at ambient (i.e., room temperature) while a temperature register value B=1300 can represent a motor temperature of 130 degrees C. Each of the parameters A and B are integer values.

The difference between A and B at 1006 represents how much difference there is between the estimated temperature at the present time and what temperature the motor 15 is estimated to be at after time period P has elapsed. This difference C (an integer value which may be referred to as a pre-scaled adjustment C) is divided by a scalar E (also an integer value) at 1008. The scalar E may be understood as a variable scalar adjustment which varies the rate at which the temperature register responds to changes in current and can be considered the time constant for the motor 15. Since each motor has a different time constant E, this value can vary from tool to tool. The result of C/E represents a temperature adjustment value F for the motor 15. This temperature adjustment value F represents how much the temperature has either increased or decreased in the time increment M.

At 1010, F (a signed value) is then either added or subtracted back into the temperature register value B to create a new temperature register value H to be used in a next iteration at 1012. If the current remains constant, as time approaches P the value of H should correspond to or equal the value of A, such that the new estimated motor temperature approximates or is substantially equal to the estimate of what the motor temperature would be at the end of time period P.

Thus, the greater the distance between the current measurement as reflected by A (i.e., the estimate of what the motor temperature will be at the end of time period P based on a constant square of average current over that time increment) and the temperature register value B, the greater the increase/decrease of the temperature register value B must be after calculations. If the integer values for A and B are equal, this represents no change in motor temperature. Thus, the temperature register value B always wants to equal the square of the current over time (i.e., A) and will increase/decrease as needed over time to maintain this relationship. At any point in time, looking at temperature register value B will give a proportionate estimate of what the motor temperature is at that given instant of time.

As an example, if the average current increases over the interval M from 5 to 20 amps (which increases parameter A, as it is a function of current squared), the temperature register value B will increase very quickly, representing a sharp increase of motor temperature since current has dramatically increased. If the average current then drops from 20 amps to 10 amps (A drops), over time the temperature register value B will decrease, signifying a drop in motor temperature.

The following equations illustrate calculations for parameters A, B, C, D, E, and H of FIG. 10A. In a perfect or ideal system, current squared times resistance gives a temperature. However, in an actual system, other factors such as fan speed, motor speed, as well as how current is measured will affect the outcome of the system. In the equations below, the parameter A is represented by the term FinalAverage$_n$; and represents the estimated temperature that the motor will get to over time (i.e., over the given time period P in this example). The register value B is expressed by the term TempReg$_{[n-1]}$, and the updated or new temperature register value determined for a number of current measurements n over time interval M is expressed as TempReg$_n$.

To accommodate these system parameters, equations for estimating motor temperature can be slightly modified. For example, in calculating parameter A (a function of average current squared), a voltage compensation term or multiplier referred to as Vfactor is added to accommodate 230V tools as well as 120V tools. Since the average current seen by a 230V tool is roughly half that seen by a 120V tool, a multiplication factor is needed for the system to operate correctly. The multiplier Vfactor may be set at "1" for 120V tools and "2" for 230V tools.

There is a current level threshold (referred to herein as 'midpoint threshold') related to fan speed. At a specific current level, the amount of heat removed from the system via a fan in the power tool 10 degrades as the fan speed decreases. A factor is added to compensate for this loss of heat removal due to decreased fan speed. The value calculated for A (FinalAverage$_n$) differs depending on whether the average current is above or below this midpoint threshold. If the average current is above the midpoint threshold, the following factor is added, (Iavg$_n$–Midpt)$^2$, which is simply the square of the calculated average current minus the threshold current value Midpt. This factor will cause currents above the midpoint to result in a higher temperature being estimated than currents below the midpoint. The amount of temperature increase is directly proportional to the amount of current increase above the midpoint.

Further, a variable may be added to compensate for lower motor speeds. This may be reflected by the expression (MaxDial–DialSetpoint)*SpdFactor. The parameter MaxDial is an A/D reading read by the microprocessor 432 which corresponds to the maximum setting on the speed dial wheel 270, and the parameter DialSetpoint is an A/D reading corresponding to the actual speed setting on the dial wheel 270. If these are equal, this speed compensation variable is 0. The parameter SpdFactor is a constant coefficient that varies from tool to tool and provides the compensation when the dial setting is set at a speed other than the maximum setting.

The above compensation for motor speed is necessary when taking average current measurements, since the conduction angle of the triac 420 affects the accuracy of the average current measurement. At lower conductions (lower speeds), the average current measurement is not as precise as at a full conduction angle (full speed), so the measurement must be compensated. This process changes depending on which measurement scheme is used. When using average current, all compensation factors are used. If RMS current is used, not as many compensation factors are needed. If a thermistor or thermocouple is used, none of the compensation factors are required.

Accordingly, the value of A—FinalAverage$_n$, which is calculated for n current measurements taken by microcontroller 430 at specific intervals of a period of time M to get a final average current, may be calculated by one of the following two mathematical equations, depending on whether the average current is above or below the midpoint threshold. Equation (1) is where average current is below the threshold level, Equation (2) is where the average current is equal to or above the current level at which fan loss must be compensated for by (Iavg$_n$–Midpt)$^2$.

$$FinalAverage_{16-bit\ max} = \sum_{n=0}^{M} \left[ \left(\frac{Iavg_n * Vfactor}{4}\right)^2_{16-bit\ max} + (MaxDial - DialSetpoint) * SpdFactor \right]^2 \quad (1)$$

$$FinalAverage_{16-bitmax} = \sum_{n=0}^{M} \left[ \left(\frac{Iavg_n * Vfactor}{4}\right)^2_{16-bitmax} + \left(Iavg_n - Midpt\right)^2_{255bitlimit} + (MaxDial - DialSetpoint) * SpdFactor \right]^2 \quad (2)$$

Accordingly, the calculation of H in FIG. 10A is reflected in Equations (3) and (4) below. The value H is the new or revised temperature register value, and reflects the updated estimate of the motor temperature. Equations (3) and (4) reflect the parameters B, C, E and F shown in FIG. 10A, essentially showing that H=B+F, where F=C/E and C=A–B. Thus, the terms in Equations (3) and (4) map as follows. H=B+(A–B)/E. Equation (3) incorporates the FinalAverage$_n$ result from Equation (1), where the average current is below the midpoint threshold, and Equation (4) incorporates Equation (2) for the calculation of FinalAverage (where the average current is equal to or above the midpoint threshold):

$$TempReg_n {}_{16-bit\ max} = TempReg_{[n-1]} + \frac{(FinalAvg_n - TempReg_{[n-1]})}{Divisor} \quad (3)$$

$$TempReg_n {}_{16-bit\ max} = TempReg_{[n-1]} + \frac{(FinalAvg_n - TempReg_{[n-1]})}{\left[\frac{(Iavg_n - Midpt)}{HighCurDivisor}\right]^2_{255\ limit}} \quad (4)$$

The numerator in the second part of each equation (3) and (4) is the parameter C of FIG. 10A, which represents (A−B) or how much difference there is between our estimated temperature at the present time and what temperature the motor will get to after time P. The scalar E, which is the denominator term in each second part of the equations (3) and (4), is different in equation (3), a constant coefficient called Divisor, as compared to equation (4), which has denominator term that accounts for a measured average current exceeding the midpoint threshold (compensation for fan losses), and divides that factor by a scalar called HighCurDivisor. These scalars Divisor and HighCurDivisor are compensation coefficients which are set to vary the time it takes for the new estimate of temperature H to be determined so that it reaches A. Two different divisors are used since at higher currents, the heating/cooling rate of the motor 15 changes due to loss of fan speed. Thus, the Divisor scalar is used in Equation 3 at lower currents and the HighCurDivisor scalar is used in equation (4) for higher currents.

Thus, the scalar E is a variable scalar adjustment which varies the rate at which the temperature register responds to changes in current. This can vary from tool to tool. In this example, the shape of the cooling/heating curves will change as the current exceeds the midpoint. The result of C/E (i.e., the second, entire quotient part of equations (3) and (4)) represents the temperature adjustment value F for the motor 15. In other words, the result of C/E indicates how much the temperature has either increased or decreased in the time increment M.

Figure 10B:
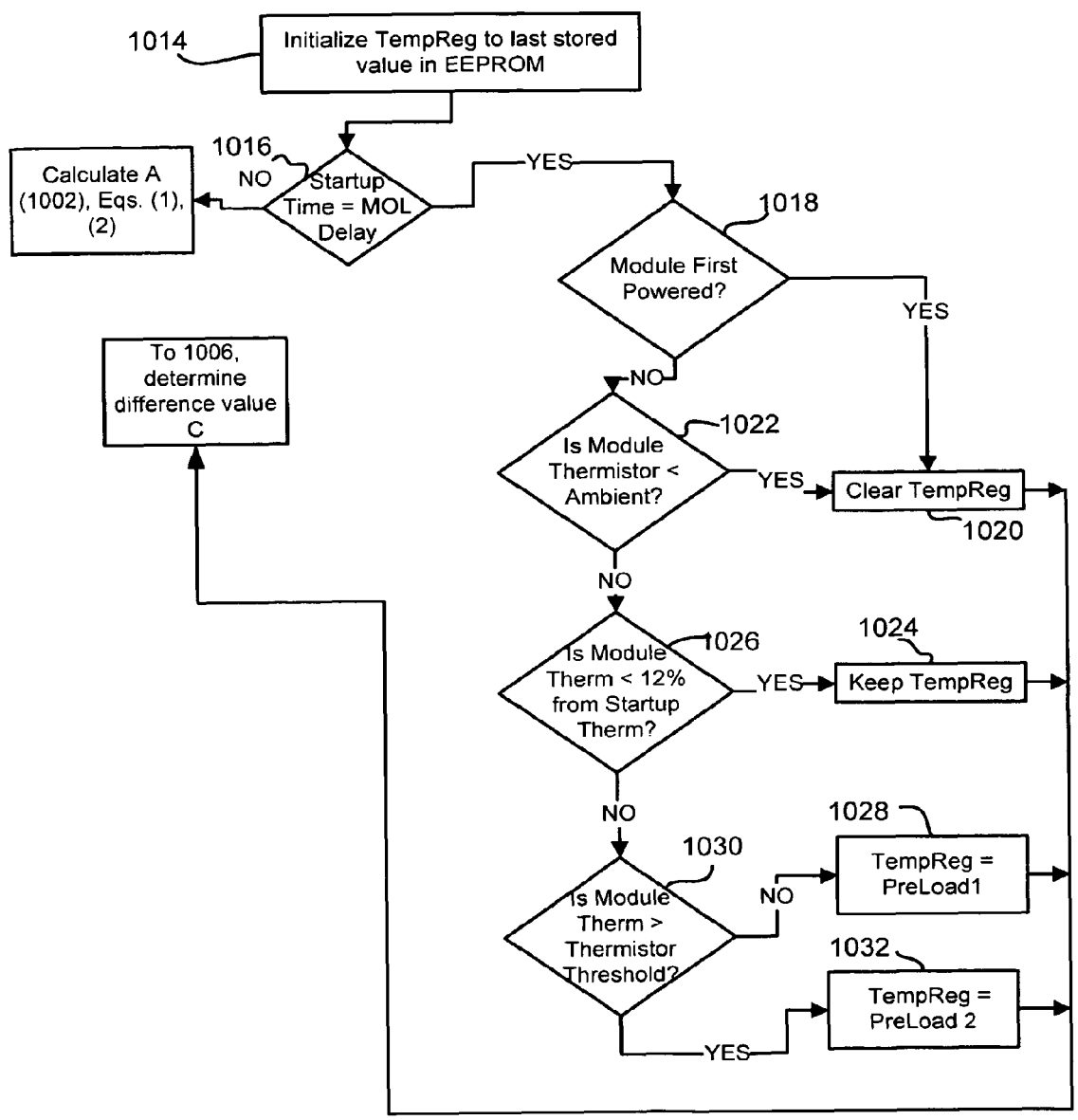
FIG. 10B is a flow diagram to illustrate how the temperature register value B is estimated after a loss of power or upon initial tool power-up.

FIG. 10B is a flow diagram to illustrate how to determine the estimated temperature of the motor at startup, i.e., the initial value B in the temperature register. Once tool 10 loses power, the controller 430 loses memory of what has previously transpired, unless information is saved on a periodic basis. Because of this, there should be a way to determine what temperature the motor 15 is at when the tool 10 is first powered up. Without this determination, a motor 15 which has been running for some time at heavy loads can be turned off and back on again rapidly and the controller 430 will reset the temperature register back to zero, indicating a room temperature tool 10. If this occurs, the tool 10 will most likely burn-up.

To prevent the potential for tool burn-up, a routine is provided beginning at 1014. Every time the microcontroller 430 updates either the temperature register value B or thermistor (i.e., sensor 410) measurement of controller 430 temperature, these values are stored in non-volatile memory (RAM 434). On startup, the latest temperature register value and sensor 410 value of controller 430 temperature which were stored just prior to the last tool shutdown are retrieved (1014) to get a picture of the state of the motor 15 just prior to last power-down. A time delay is added (1016) to obtain a measurement of estimated motor temperature as well as controller temperature at power-up of the tool. After the pre-defined delay on startup (1016) the controller 430's onboard temperature sensor (410) is read to estimate the controller temperature which is relative to motor temperature, i.e., if the controller 430 temperature is substantially high, it can be assumed that the motor 15 temperature is hot as well as long as the controller 430's temperature time constant is not much higher than the temperature constant of the motor 15.

After this delay, the microprocessor 432 measures this controller temperature off of sensor 410 and determines one of 4 states: (1) microcontroller 430 is at room temperature, (2) microcontroller 430 has not changed temperature, (3) microcontroller 430 is warm, and (4) microcontroller 430 is hot. These states are determined by comparing present temperature data to the last saved data.

If it is determined that the temperature did not change since last power-up (output of 1018 is NO, the module 100 is not first powered), and the sensor 410 value is greater than ambient (output of 1022 is NO), but within a defined margin to the previous temperature, i.e., close to the startup temperature (less than 12% difference, output of 1026 is YES), the old value B in the temperature register (i.e., TempReg$_{[n-1]}$ in Equations (3) or (4)) is restored (1024) to indicate the motor temperature did not change (1024, 1026). If it is determined from sensor 410 that the controller 430 temperature is less than room temperature as the module 100 is first powered, the value of B in the temperature register is reset back to zero (1022) indicating room or ambient temperature (1020), i.e., a cold power tool 10.

If the controller 430 is determined to be either warm (output of 1030 is NO) or hot (output of 1030 is YES), new values for the temperature register value B are pre-loaded at steps 1028 or 1032 from non-volatile storage such a EEPROM (ROM 436). In an example, a warm controller 430 could be at 80° C. and a hot controller 430 (and hence hot tool 10) could be at 150° C. With the same value of B or revised value of B loaded in the temperature register, the motor temperature estimation function is implemented as described above with respect to FIG. 10A.

In an alternative, another method of determining if a tool is cold, warm, or hot at power-up in order to determine the initial temperature register value B is to measure the gate voltage of the triac 420 or other power device in the module 100 or tool 10. The temperature of an active device can be determined through its junction voltage. These devices may include triacs, transistors, diodes, or any other silicone device containing a PN or NP junction. Therefore, electronic module 100 or microcontroller 430 temperature can be estimated without using an additional sensor 410 such as a thermistor. The junction of the gate drive transistor of triac 420 may be used to determine temperature instead of using thermistor 410. This may be explained by the following relationships below.

The temperature to voltage relationship of a junction may be defined as shown in Equation (5) below.

$$V_\gamma(T_1) - V_\gamma(T_0) = k_T(T_1 - T_0) \qquad \text{Equation (5)}$$

Where:
$T_0 = 25°$ C.
$T_1 =$ junction temperature (° C.)
$V_\gamma(T_0) =$ junction voltage at 25° C.
$V_\gamma(T_1) =$ junction voltage at T.
$k_T =$ temperature coefficient of junction Example values for the above are:
$T_0 = 25°$ C.
$T_1 = ?$ (° C.)
$V_\gamma(T_0) = 0.7$V
$V_\gamma(T_1) = 0.65$V
$k_T = -2.0$ mV/°C.

Transposing equation (5) to solve for $T_1$ device temperature gives:

$$\frac{V_\gamma(T_1) - V_\gamma(T_0)}{k_T} + T_0 = T_1 \quad T_1 = 50° C.$$

Actual values may vary depending upon the device used within the circuit 400 of module 100. Accordingly, a potential benefit of determining if a tool is cold, warm, or hot during power-up as an input to the temperature estimate algorithm is to sense voltage of an already existing component, like the transistor at the gate drive of triac 420, in order to estimate or determine module 100 temperature/controller 430 temperature at start-up. Accordingly, module 100 or microcontroller 430 temperature can be estimated without using an additional sensor 410 such as a thermistor.

Employing a motor temperature estimation routine in the module 100 versus placing a thermistor or thermocouple directly on the motor 15 may reduce cost and provide ease of use. The described method requires no additional sensors or wires to implement since all required signals and peripherals are built directly into the module 100. The task of placing thermocouples, thermistors, or wires on or around a motor 15 is not easy to accomplish and there is a risk of wires melting or shorting together. The above algorithm provides an inexpensive, efficient, and easy way to estimate motor temperature without physically accessing the motor 15.

Additionally, the estimated motor temperature(s) determined from the motor temperature estimation algorithm as described in FIG. 10A may serve as an input to the microcontroller 430 so as to trigger a warning-type of protection mechanism, such as through tactile feedback, motor foldback, etc. As motor temperature begins to closely approach a motor overload condition, such as a high temperature setpoint the user can avoid reaching an overload state (due to reaching an over-temperature limit) since the microcontroller 430 initiates tactile feedback or foldback via control of the triac 420's conduction angle, or initiates a combination of foldback with LED illumination as a warning (i.e., that tool motor is approaching an over-temperature limit), or initiates a combination of tactile feedback with LED illumination as a warning on the housing 18. Therefore, the motor temperature algorithm may be employed to estimate motor temperature at different points in time in an effort to avoid or to detect an impending motor overload condition.

Figure 11:
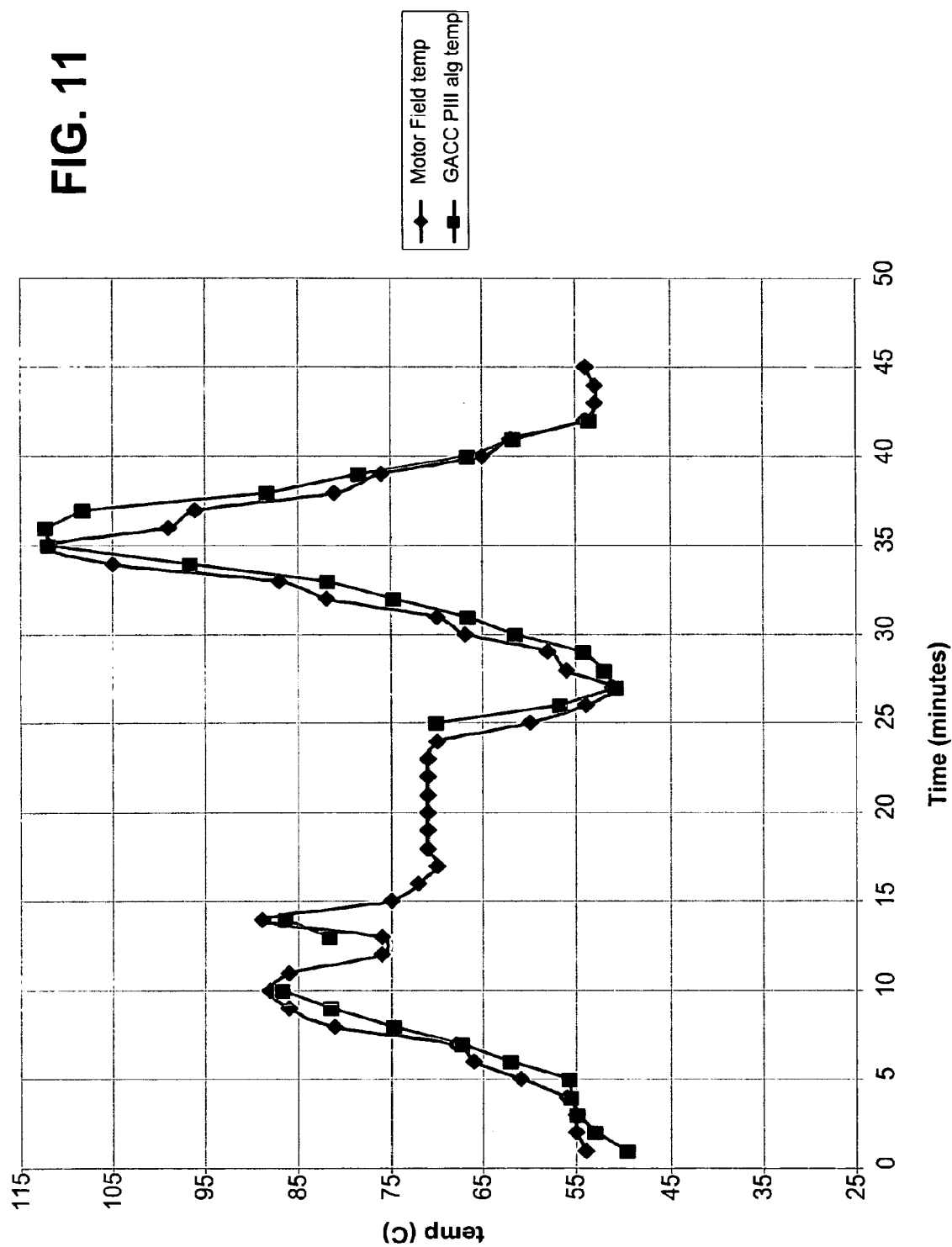
FIG. 11 is a graph comparing the estimated motor temperature as calculated by the algorithm of FIG. 10A with actual measured motor field temperature for a 120V small angle grinder configured with the example control module 100.

FIG. 11 is a graph comparing the estimated motor temperature as calculated by the algorithm of FIG. 10A with actual measured motor field temperature for a 120V small angle grinder configured with the example control module 100. The plotted data evaluates motor temperature algorithm estimations to actual motor temperature. As can been seen from FIG. 11, the test to generate the plot results tested increases or decreases in motor load, and turned the tool motor on/off/on in an effort to exercise all aspects of the motor temperature algorithm. The algorithm results substantially mimic actual measured motor temperature, with a worst case difference at any one data point of about 13 degrees.

Figure 12:
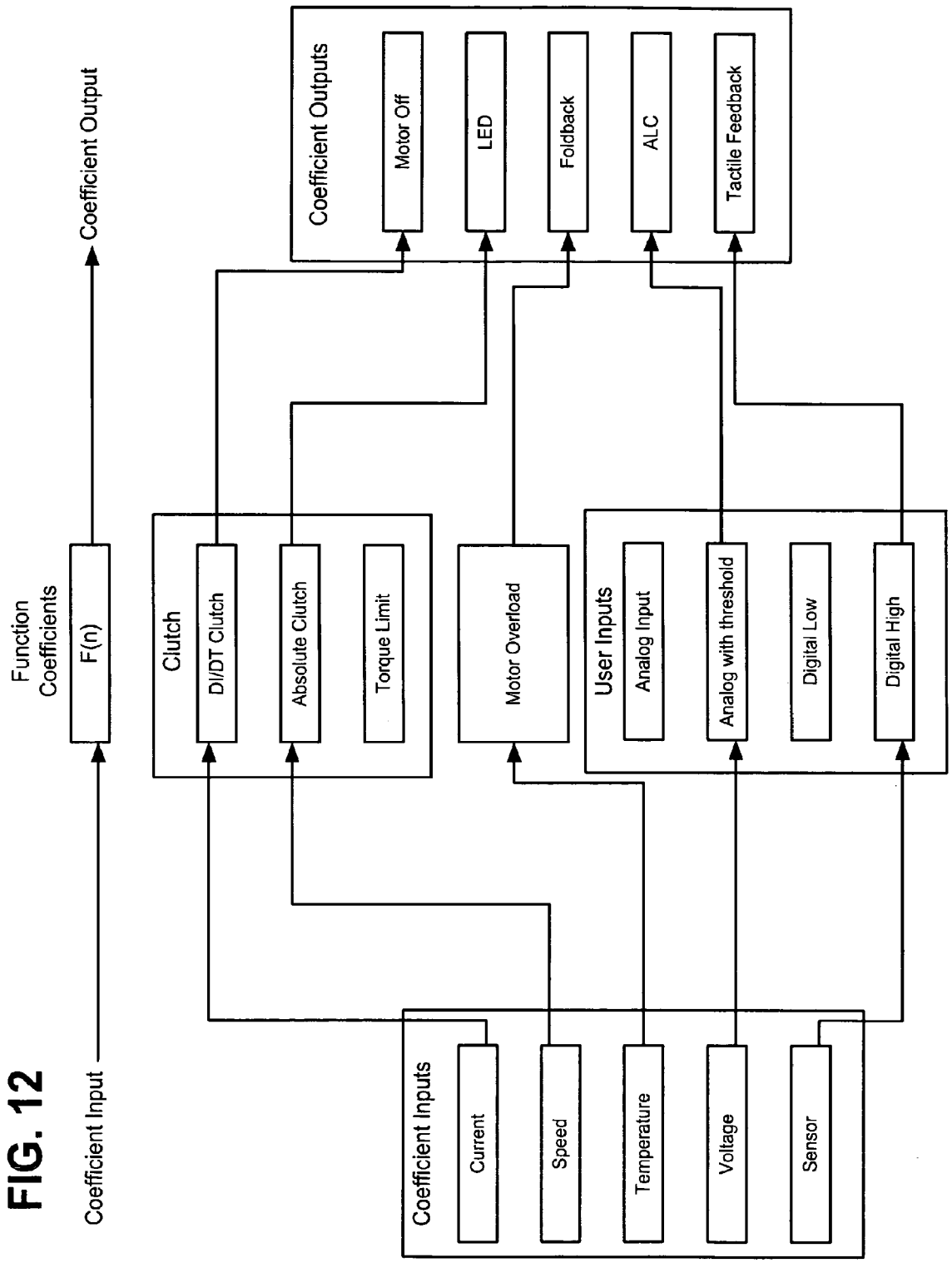
FIG. 12 is an overview of the relationships between coefficient inputs, protection/control methodologies and devices, and coefficient outputs in accordance with the example embodiments.

FIG. 12 is an overview of the relationships between coefficient inputs, control and protection methodologies within the control module 100 and/or user inputs, collectively represented as functions in the center column of FIG. 12, and coefficient outputs from these functions in the right-hand column. In the right hand column, the output coefficient ALC refers to the breakthrough torque described above to allow a user of a power tool to finish a given job so that the motor does not burn out or stall completely.

FIG. 12 is provided to demonstrate how a single generic control module 100 can be re-programmed via non-volatile memory storage such as EEPROM or flash memory to meet the needs of a variety of different tools.

The protective or control functions discussed thus far, such as the motor temperature estimation algorithm, overload control (absolute and Di/Dt clutch modes), tactile feedback, etc. may be enabled or disabled via this non-volatile memory storage. Additionally, coefficient inputs and outputs may be changed for each enabled control or protection methodology based on whether a particular soft-coded coefficient is stored in non-volatile memory such as EEPROM or FLASH memory.

FIG. 12 shows example coefficient inputs on the left, which may be input to certain functions. As shown, these functions may include the EOC functions, a torque limiting function as described above, a motor overload function (which may incorporate the motor temperature estimation algorithm in FIGS. 10A-B). The functions may also include inputs which can configured as either analog, digital, active high or active low all by changing these soft-coded coefficients in non-volatile memory as opposed to changing firmware Different inputs and outputs may be set for different functions, and different functions may be enabled or disabled in control module 100. For example, an absolute clutch mode for the EOC can be set up in a given corded power tool using current as the input, and with the output of the function being tool shut down if the threshold is exceeded. A different tool can have a Di/Dt clutch mode setup using speed as the input to the function and turning on an LED as an output of the function if the threshold rate is exceeded. Thus, two separate tools having the same generic control module 100 inside may be configured with different functions that sample different parameters and output different results (i.e., different protective actions based on different output coefficients).

The soft-coded coefficients in non-volatile memory (which can be RAM 434, flash memory or EEPROM if alterable ROM 436 is configured as EEPROM) provide the ability to change how the module 100 interacts with a tool 10 without changing the firmware or base-code inside the microcontroller 430. By altering only the non-volatile memory of a microcontroller 430, tool performance can be altered where before this was not possible.

The example embodiments being thus described, it will be obvious that the same may be varied in many ways. Such variations are not to be regarded as departure from the example embodiments, and all such modifications as would be obvious to one skilled in the art are intended to be included within the scope of the appended claims herein.

What is claimed is:

1. A method of estimating tool motor temperature of a tool motor in a corded power tool, comprising:

comparing a motor current value representing an estimate of what temperature the tool's motor will be after a given time period has elapsed, assuming constant current, to a temperature register value representing an estimate of the motor temperature at a present point in time, and updating the temperature register value based on the comparison so that the temperature register value equals the motor current value after the given time period has elapsed wherein upon tool startup, an initial temperature register value is determined by retrieving stored temperature data at the previous tool shutdown from a memory of a controller in the tool, the stored temperature data including a latest temperature register value at the last tool shutdown and a latest controller temperature at the last shutdown, after a given delay upon tool startup, determining controller temperature at startup, and comparing the determined controller temperature at startup to the stored controller temperature to determine the initial temperature register value.

2. The method of claim 1, wherein determining controller temperature at startup includes measuring controller temperature at startup from a sensor.

3. The method of claim 1, wherein determining controller temperature at startup includes estimating controller temperature at startup based on a junction voltage of an active electronic device in the power tool.

4. The method of claim 1, wherein the initial temperature register value is set to zero if controller temperature at startup is less than stored controller temperature.

5. The method of claim 1, wherein the initial temperature register value on startup is set to the latest stored temperature register value if controller temperature at startup is within a given margin to the latest stored controller temperature at the previous tool shutdown.

6. The method of claim 1, wherein a first preload value stored in memory is set as the initial temperature register value if the comparison step indicates a warm controller at startup and a second preload value stored in memory is set as the initial temperature register value if the comparison step indicates a hot controller at startup.

7. The method of claim 1, wherein updating the temperature register value includes increasing the temperature register value if the motor current value is greater than the temperature register value or decreasing the temperature register value if the motor current value is less than the temperature register value.

* * * * *